United States Patent [19]

Ichimura

[11] Patent Number: 5,894,306
[45] Date of Patent: Apr. 13, 1999

US005894306A

[54] DATA DISPLAY DEVICE AND DATA RECORD/PLAYBACK DEVICE DISPLAYING CONSECUTIVE DATA AND USER INPUT IN ASSOCIATION WITH EACH OTHER

[75] Inventor: Satoshi Ichimura, Nakai-machi, Japan

[73] Assignee: Fuji Xerox Co., Ltd., Tokyo, Japan

[21] Appl. No.: 08/901,699

[22] Filed: Jul. 28, 1997

[30] Foreign Application Priority Data

Aug. 2, 1996 [JP] Japan .................. 8-220334

[51] Int. Cl.$^6$ .................................................. G06F 3/00
[52] U.S. Cl. ..................... 345/331; 345/339; 345/330
[58] Field of Search ........................... 345/329, 330, 345/331, 332, 971, 972, 302

[56] References Cited

U.S. PATENT DOCUMENTS

| | | | |
|---|---|---|---|
| 5,613,032 | 3/1997 | Cruz et al. | 386/69 |
| 5,717,869 | 2/1998 | Moran et al. | 345/331 X |
| 5,717,879 | 2/1998 | Moran et al. | 345/331 |
| 5,768,607 | 6/1998 | Drews et al. | 345/302 |

FOREIGN PATENT DOCUMENTS

| | | | |
|---|---|---|---|
| 6-176171 | 6/1994 | Japan | G06F 15/74 |
| 6-205151 | 7/1994 | Japan | H09N 1/00 |
| 6-343146 | 12/1994 | Japan | G06F 15/40 |
| 7-110822 | 4/1995 | Japan | G06F 17/30 |
| 7-182365 | 7/1995 | Japan | G06F 17/30 |
| 7-226931 | 8/1995 | Japan | G06F 13/00 |

OTHER PUBLICATIONS

Weber, K. et al., "Marquee: A Tool For Real–Time Video Logging", Human Factors in Computing Systems, pp. 58–64, (1994).

*Primary Examiner*—Raymond J. Bayerl
*Assistant Examiner*—Chadwick A. Jackson
*Attorney, Agent, or Firm*—Oliff & Berridge, PLC

[57] ABSTRACT

This invention provides a data record/playback device that retrieves stored data by specifying user-input data, and makes the retrieving easier. The data record/playback device, having: user input unit for receiving user input from a user; user input detector for detecting the user input through the user input unit; consecutive data input unit for receiving consecutive data including at least one of audio data and image data; consecutive data storage for storing consecutive data received by the consecutive data input unit; state detector for detecting a state that includes at least one of circumstantial information and eventual information about a moment when the user input detector detects the user input; association data storage for storing association data that includes the user input detected by the user input detector, the state detected by the state detector, and the storage position where the consecutive data is stored in association with each other; and display unit for displaying the user input detected by the user input detector and the state detected by the state detector in association with each other in accordance with the association data stored in the association storage.

5 Claims, 31 Drawing Sheets

PROCESSING ROUTINE OF USER-INPUT DATA DETECTION SECTION 21

PROCESSING ROUTINE OF STATE DETECTOR 24

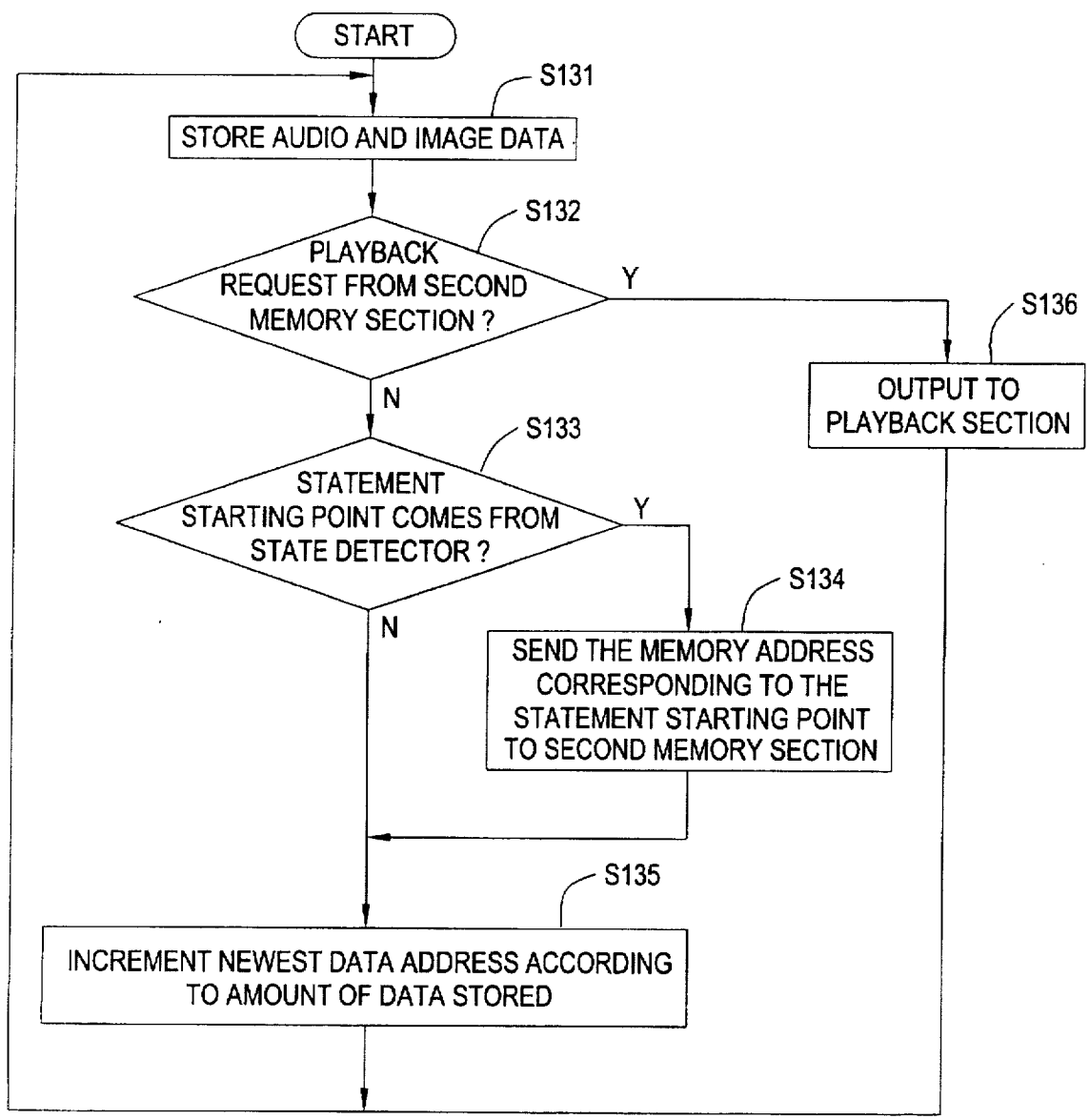

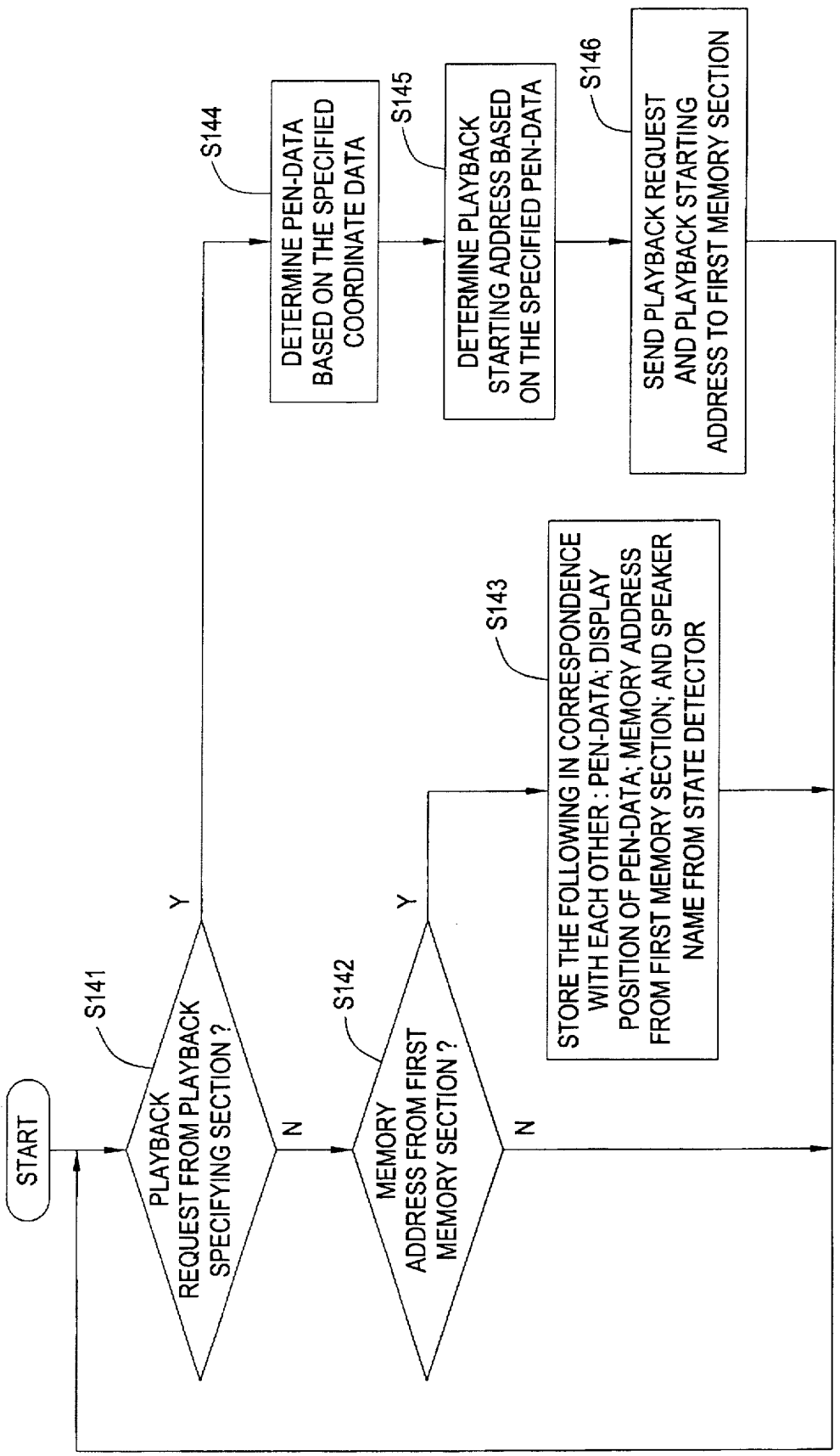

FLOWCHART OF PLAYBACK SECTION 28

FLOWCHART OF DISPLAY SECTION 25
(SECOND EMBODIMENT)

FIG. 16
Participant Table
| Participant ID | Speaker name | Character color |
|---|---|---|
| 1 | Suzuki | Blue |
| 2 | Tanaka | Green |
FIG. 17
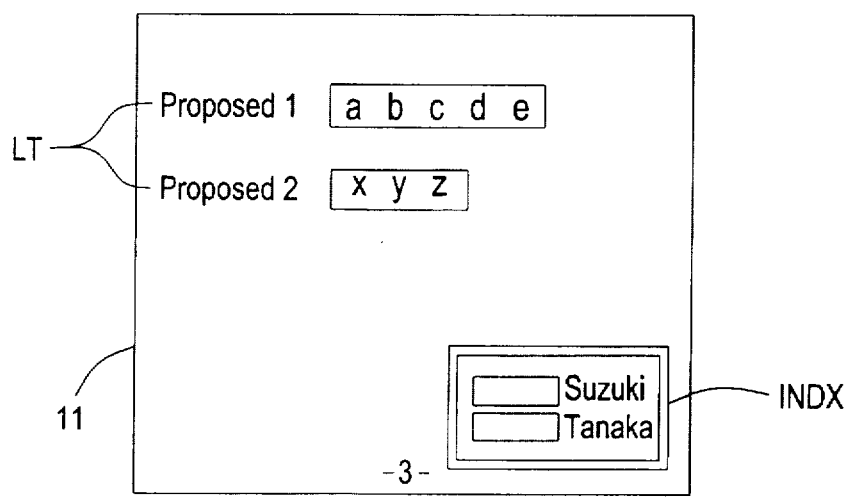
FIG. 18
DATA STRUCTURE OF SECOND MEMORY SECTION
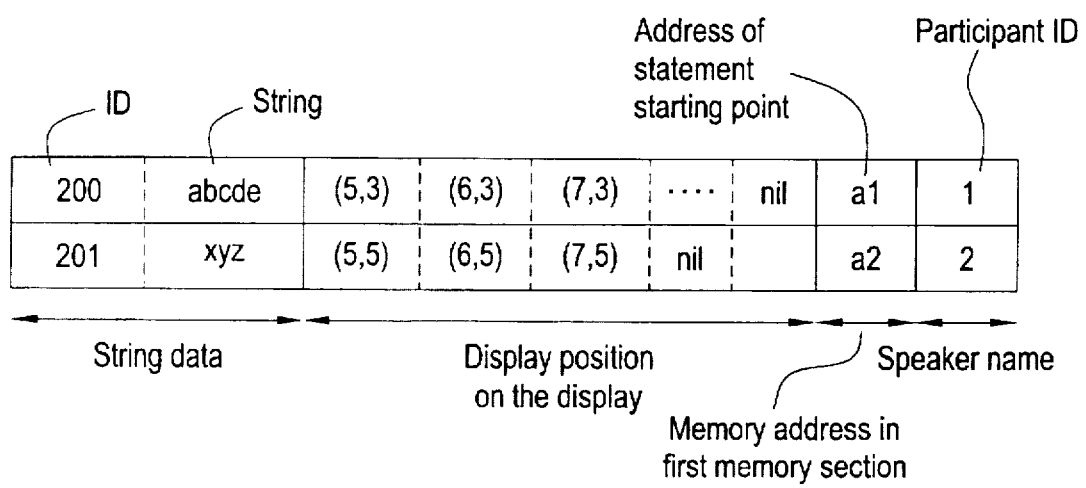

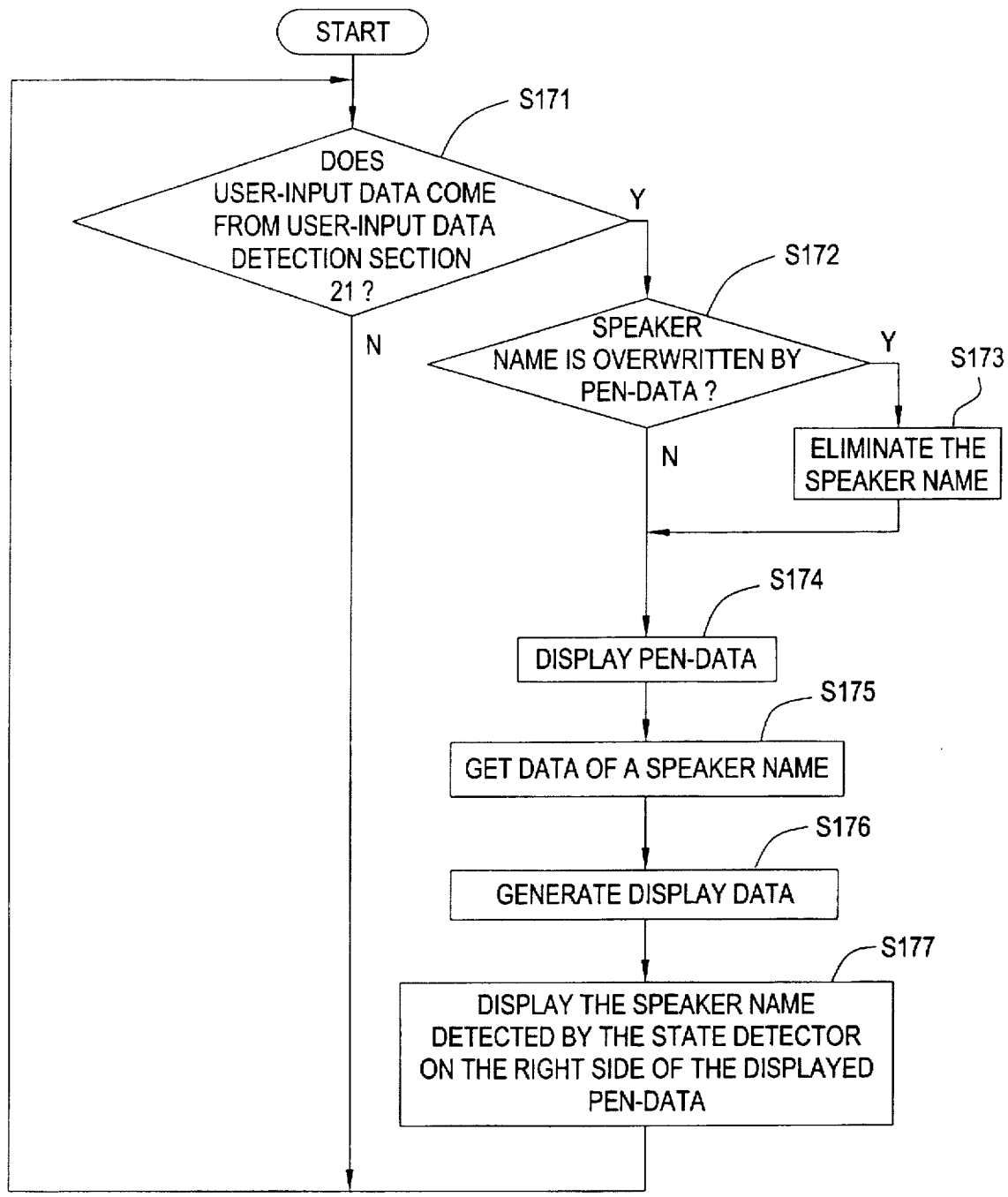

FLOWCHART OF DISPLAY SECTION 25

FLOWCHART OF DISPLAY SECTION 24

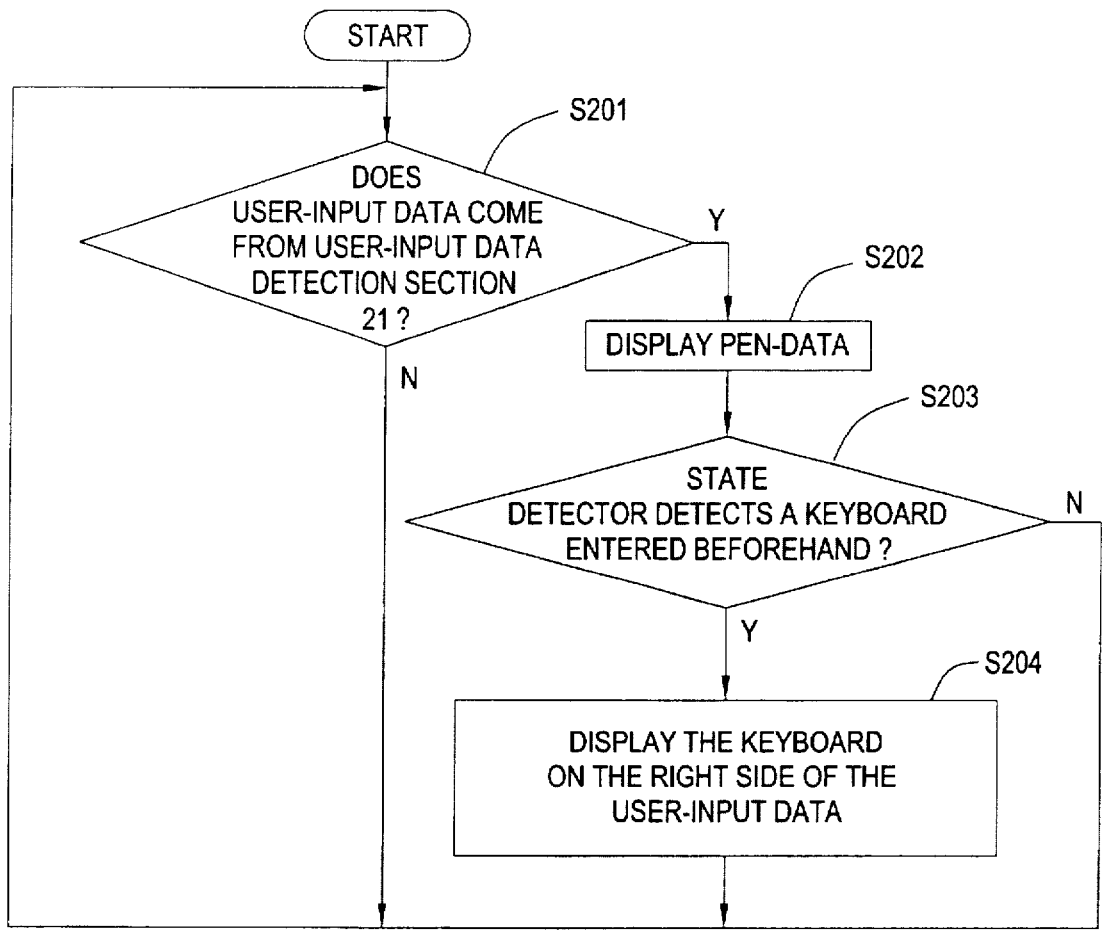

FIG. 26A

| IDENTIFIER | KEYWORD STRING ENTERED BEFOREHAND | |
|---|---|---|
| 1 | SUMMARY | 5 |
| 2 | CONCLUSION | 10 |
| 3 | IMPORTANT | 5 |
| 4 | HOMEWORK | 3 |
| ⋮ | ⋮ | ⋮ |

FIG. 26B

| IDENTIFIER | PATTERN ENTERED BEFOREHAND | |
|---|---|---|
| 1 | LIGHTING OF OHP | 5 |
| 2 | PAGE SWITCHING | 10 |
| 3 | LIGHTING OF A PROJECTOR | 5 |
| 4 | LIGHTING OF A LIGHT | 3 |
| ⋮ | ⋮ | ⋮ |

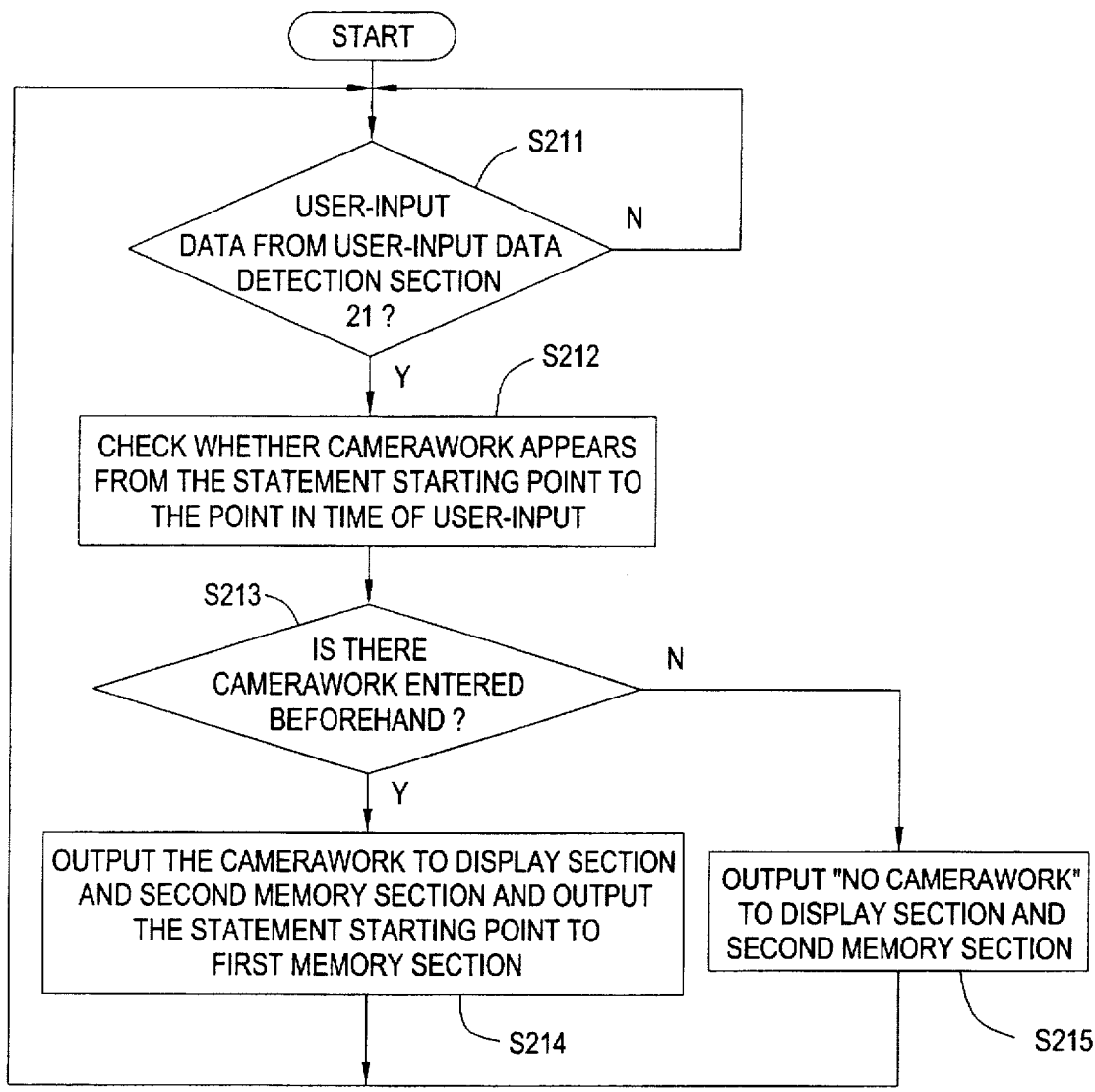

FLOWCHART OF DISPLAY SECTION 25

DATA STRUCTURE OF SECOND MEMORY SECTION
(CORRESPONDING TO ONE PEN ENTRY)

FLOWCHART OF DISPLAY SECTION 25

DATA DISPLAY DEVICE AND DATA RECORD/PLAYBACK DEVICE DISPLAYING CONSECUTIVE DATA AND USER INPUT IN ASSOCIATION WITH EACH OTHER

BACKGROUND OF THE INVENTION

1. Field of Invention

This invention relates to a data display device that displays user input data and a data record/playback device that stores multimedia data with user input data and plays back or displays the stored user input data and the multimedia data in association with each other.

2. Description of Related Art

For recording important points of meetings, lectures, interviews, conversations using telephones or videophones, video image, and the like, a recordist commonly records them. For example, in a meeting, one of the participants of the meeting works as a recordist to record every statement from all participants or to record important items. However, since contents of a meeting or details of the story is not recollected from a note written in the meeting or the speaker name of a statement is not recorded, it is often difficult to make minutes after the meeting.

Conventionally, there have been proposed devices that use digital disks, digital still cameras, videotapes, semiconductor memory, and the like to store and playback data such as meetings, lectures, interviews, conversations using telephones, and videophones, as well as video images, images from monitoring cameras, and the like. Compared to having a reporter manually write down only the important points of the information to be recorded, the use of such data storage devices has the advantage of allowing voices and images to be recorded completely without omissions.

These devices can involve: recording digital signals sent via a computer network onto a storage medium; recording analog input signals from an video camera or a microphone directly to a storage medium; or encoding and converting such analog signals into digital signals.

However, when the method that records the whole meeting has no function to retrieve the recorded data, all contents of the recorded data should be played back to make minutes, that is, summarized contents of the meeting. Thus, it takes extremely long time to make minutes. In addition, these devices had a problem in that desired sections from the recorded voices or images could not be quickly searched.

To overcome this problem, tape recorders and videotape recorders have been proposed that allow easy searching of important sections by adding check-marks to important sections in the incoming audio signals or incoming image signals.

However, these check-marks only serve to specify the position of important sections. It is not possible to indicate which section of the audio signal or the image signal corresponds to each check-mark. Thus, all the audio or image signals that have been check-marked must be played back to determine the contents. Furthermore, it is also necessary to perform the awkward operation of pressing a button while someone is talking, thus distracting the user from the statement taking place.

For these reasons, there have been proposed devices in which audio signals or image signals that are input continuously are stored and played back so that they are associated with user-input data that has been entered via a pen or a keyboard by the user at selected points in time. By using such devices, the audio signal or the image signal can be recorded while the person making the recording performs pen or keyboard input in the same way that a reporter would take notes. By referring to the entered notes later, the portions of the audio or image signal to be played back can be easily selected and played back.

As this kind of art, for example, Japanese laid-open publication No. 7-226931 discloses a device that make a minutes creation work after the meeting effective by storing multimedia data entered by a meeting attendee in association with text data inputted by an recordist. By using this device, when one of the pieces of text data is selected after the meeting, the multimedia data associated with the selected text data can be easily retrieved. Thus, circumstances of the meeting can be reproduced from the meeting note written by the recordist.

For example, in Japanese laid-open publication number 7-182365, Japanese laid-open publication number 6-176171, Japanese laid-open publication number 6-343146, ACM CHI '94 Proceedings pgs. 58–64 ("Marquee: A Tool for Real-Time Video Logging") the subject matter of which are incorporated herein by reference, there are proposed devices wherein user-input data is associated with audio signals or image signals by using a time stamp. When the data is to be played back, a piece of user-input data displayed on a screen can be specified, and the audio signals or image signals recorded at the same time as the specified user-input data was recorded, can be played back.

In Japanese laid-open publication number 6-205151, the subject matter of which is incorporated herein by reference, there is disclosed a device that records audio signals or image signals while adding an index whenever user input has been interrupted for a fixed period of time. When playback is to be performed, user-input data displayed on a screen can be specified, and the audio signals or image signals from the index section corresponding to the specified user-input data is played back.

Further, Japanese laid-open publication number 7-110822 discloses a hypermedia device in which input data from the user and audio or image signals are associated with each other, and then are entered into the computer. Thus, this hypermedia device automatically creates a link between the user-input data and audio or image signals.

By using the devices disclosed in the aforementioned Japanese laid-open publication number 7-182365, 6-176171, 6-343146, 6-205151, 7-110822, and ACM CHI'94 Proceedings pgs. 58–64, the recordist can input data by using a pen or keyboard as if he wrote a note, and audio or image data are recorded. Thus, by referring to the inputted note (user-input data) later, a portion of the audio or image signals, which is desired to play back, can be easily selected and played back. This makes the creation of minutes efficient.

However, those conventional arts described above display only user-input data, such as pen data or a string entered from a keyboard, on the display screen. Data referring to the circumstances when the user-input data is entered is not displayed.

When minutes are created by selecting important points of a meeting from the recorded multimedia data and user-input data, and then editing them, if retrieval in the editing work can be performed easily and certainly by using only data displayed on a screen, retrieving work becomes much easier.

In the conventional arts described above, user-input data are displayed on a screen. When one of the displayed user-input data is specified, audio data or image data corresponding to the specified user-input data can be retrieved.

However, all the user-input data do not have the same priority. Also all the multimedia data that is recorded corresponding to the user-input data does not have the same priority. In addition, the priority of the multimedia data changes according to search condition during the editing.

Thus, the conventional arts described above simply display user-input data as a cue of retrieving. Therefore, it is difficult to know the priority or meaning of the user-input data from the display of the user-input data. Further, there is no cue to know the contents of the multimedia data that is stored corresponding to the user-input data.

Thus, in the retrieving of the conventional arts described above, the priority or meaning of each piece of the audio data or image data corresponding to each of the user-input data cannot be specified, unless audio data or image data corresponding to all the user-input data are played back. In other words, in the conventional art described above, a cue to retrieve audio data or image data is only the user-input data displayed on a screen. The user-input data is sometimes insufficient to retrieve a required audio or image data.

For example, when comments from a particular speaker is required to be played back, it is impossible to know which user-input data was recorded for a statement of the speaker, unless the user intentionally recorded the speaker who speaks at the point in time of user input. Thus, portions of audio data and portions of image data corresponding to user input data should be played back one after another, and their contents should be examined, in order to retrieve comments from the speaker.

Japanese Patent Laid-Open Hei.7-226931 described above disclose a method to store text data inputted by the user associated with the data identifying the speaker who speaks when the text is inputted. But the association therebetween is not displayed on the screen. Thus, the association between the user-input data and the comment of the speaker cannot be used during retrieving operation.

Japanese Patent Laid-Open Hei.7-182365 discloses a method for creating a series of image frames for each speaker, and a method for displaying a history of the time points of change of speakers and the speakers on the time axis. However, in the art disclosed by Japanese Patent Laid-Open Hei.7-182365, since these data are not displayed in association with user-input data, data that shows the association between the user-input data and the comment of speaker cannot be referred at the time of retrieving operation.

In addition, Japanese Patent Laid-Open Hei.7-182365 discloses a method for displaying a history of all time points of changes of speakers and the speakers on a screen. However, in a device that retrieves audio or image data by using user-input data as a cue, it is redundant to display a history of all time points of change of speakers. Since it makes display on a screen rather complicated, retrieving operation becomes difficult.

SUMMARY OF THE INVENTION

The present invention has been made in view of the above circumstances. An object of the present invention is to display data representing the background of each user-input data on a screen in addition to the user-input data inputted by the user so as to use them as cues for retrieving of multimedia data. To achieve the object, as embodied and broadly described herein, this invention provides a data display device, comprising: user input unit for receiving a user input from a user; user input detector for detecting the user input through the user input unit; state detector for detecting a state that includes at least one of circumstantial information and eventual information about a moment when the user input detector detects the user input; and display unit for displaying the user input detected by the user input detector and the state detected by the state detector in association with each other.

This invention further provides a data record/playback device, comprising: user input unit for receiving user input from a user; user input detector for detecting the user input through the user input unit; consecutive data input unit for receiving consecutive data including at least one of audio data and image data; consecutive data storage for storing consecutive data received by the consecutive data input unit; state detector for detecting a state that includes at least one of circumstantial information and eventual information about a moment when the user detector detects the user input; association data storage for storing association data that includes the user input detected by the user input detector, the state detected by the state detector, and the storage position where the consecutive data is stored in association with each other; and display unit for displaying the user input detected by the user input detector and the state detected by the state detector in association with each other in accordance with the association data stored in the association storage.

This invention further provides a data record/playback device, comprising: user input unit for receiving user input from a user; user input detector for detecting the user input through the user input unit; consecutive data input unit for receiving consecutive data including at least one of audio data and image data; condition-matching interval detector for detecting a condition-matching interval in the consecutive data that matches a prescribed requirement; temporary storage for temporarily storing the consecutive data received through the consecutive data input unit in association with the condition-matching interval detected by the condition-matching interval detector; compression unit for compressing the consecutive data stored in the temporary storage so that a compressing state of the consecutive data from a specific interval is different from a compressing state of the consecutive data from the other intervals, the specific interval being determined according to the user input detected by the user input detector and the condition-matching interval detected by the condition-matching interval detector; consecutive data storage for storing consecutive data compressed by the compression unit; association data storage for storing association data that includes the user input detected by the user input detector, the state detected by the state detector, and the storage position where the consecutive data is stored associating with each other; and display unit for displaying the user input detected by the user input detector and the compression state of the consecutive data that is received by the consecutive data input unit when the user input is received through the user input detector in association with each other, in accordance with the association data stored in the association storage.

BRIEF DESCRIPTION OF THE DRAWINGS

FIG. 9 illustrates a summary of the operation performed by the display section of the first embodiment.

FIG. 10 is a flowchart showing an example of the operation performed by the first memory section of the first embodiment.

FIG. 11 is a flowchart showing an example of the operation performed by the second memory section of the first embodiment.

FIG. 16 illustrates a summary of the operation performed by the display section of the second embodiment.

FIG. 17 shows an example of displayed image of the second embodiment.

FIG. 18 illustrates the data stored in the second memory section of the second embodiment.

FIG. 20 is a flowchart showing an example of the editing operation performed by the display section of the third embodiment.

FIG. 24 is a flowchart showing an example of the operation performed by the display section of the fifth embodiment.

FIGS. 26A–26B illustrates a summary of the operation performed by the state detector of the sixth embodiment.

FIG. 27 is a flowchart showing an example of the operation performed by the state detector of the seventh embodiment.

DETAILED DESCRIPTION OF PREFERRED EMBODIMENTS

In the first embodiment, the data storage/playback device of the present invention is implemented for the recording of meetings.

Figure 2:
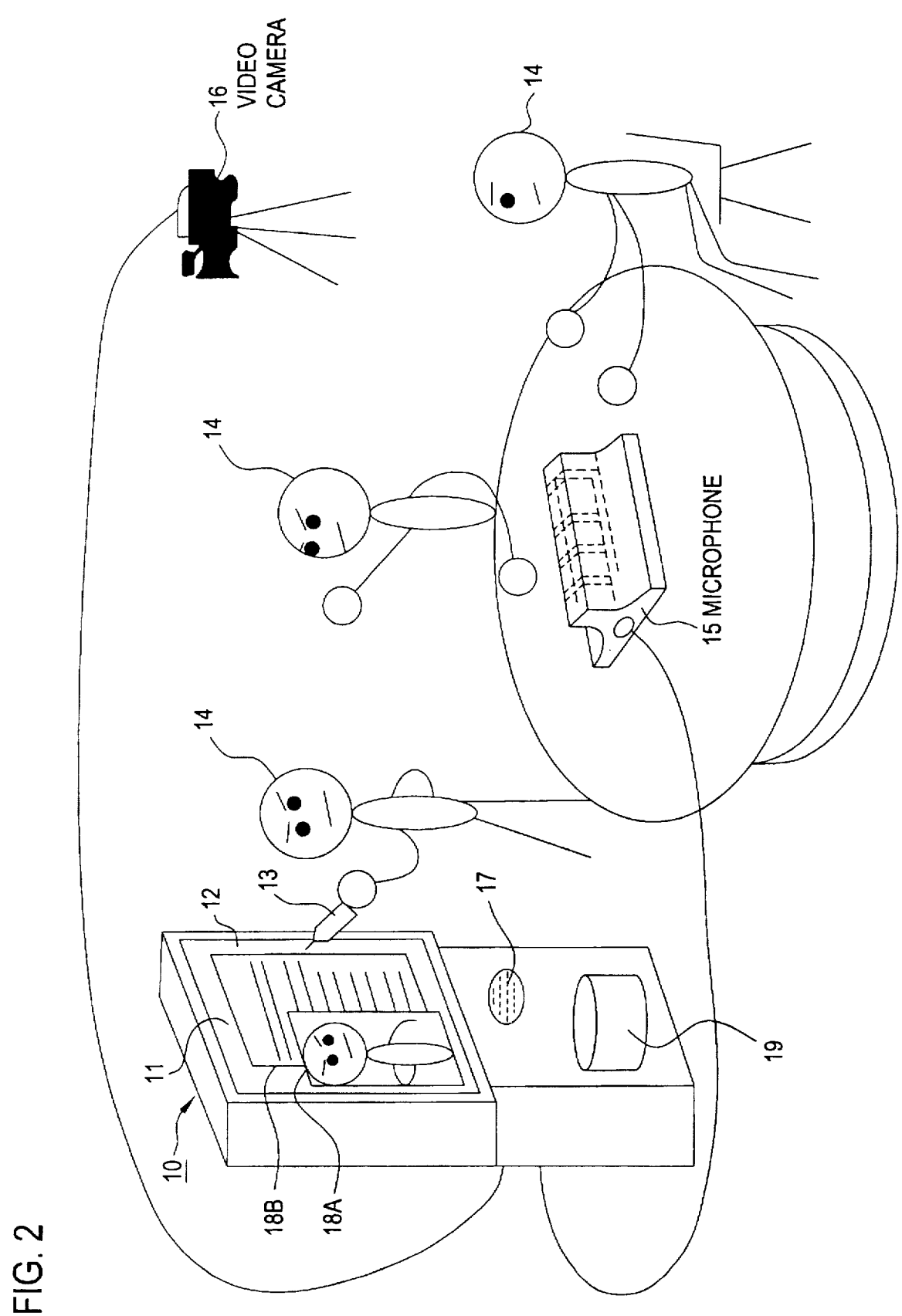
FIG. 2 is a schematic drawing illustrating the over all structure of a conference system in which an embodiment of the data record/playback device of the present invention is implemented.

FIG. 2 shows a setting for a meeting in which this embodiment would be used. An electronic meeting device 10, in which an electronic pen 13 is used to write onto a projector screen in the same way as a marker would be used to write on a whiteboard, is shown. The device allows information relating to the meeting, conclusions, and the like to be stored as electronic files. Thus, electronic meeting device 10 is internally equipped with a personal computer (not shown).

It is also possible to connect the device to a network using ISDN via a personal computer. This allows the audio data and image data from the meeting to be shared simultaneously with a remote site. This provides an environment which gives an illusion that the meeting is being conducted in a single room.

Electronic meeting device 10 comprises screen 11. The display on the screen of screen 11 is a projection display, in which images are displayed on the screen by projecting from the back.

In this case, a touch panel 12 is adhesed to screen 11. Touch panel 12 detects handwritten input data entered by a user 14 using electronic pen 13. The output from touch panel 12, i.e. the output from detection of user-input data, is the coordinate position of the contact input from electronic pen 13 on screen 11. This output from the detection of user-input data will be processed by the personal computer and stored in memory, as described later.

Electronic meeting device 10 also includes an audio input terminal and an image input terminal. In this embodiment, the voices from a plurality of meeting attendees are picked up by microphone 15 and the resulting audio signal is sent through the audio input terminal. Also, an video camera 16 picks up the meeting setting and documents, and the resulting image signals are sent through the image input terminal.

The audio data received through the audio input terminal is played by a speaker 17 and is also processed by the internal personal computer as described below and is stored in memory in association with the user-input data and image data.

Referring to FIG. 2, the image data from the video camera connected to the image input terminal of electronic meeting device 10 and the image of electronic text sent via the personal computer in the electronic meeting device are displayed on the display screen of electronic meeting device 10 in separate window images 18A, 18B. The image data displayed on screen 11 is also stored in memory in association with the user-input data and audio data described above.

The personal computer inside electronic meeting device 10 contains a data record/playback device. This data record/playback device saves the user-input data, audio data, and image data described above and saves and plays back the data in the manner described below. In FIG. 2, a data storage section 19 is shown.

Figure 1:
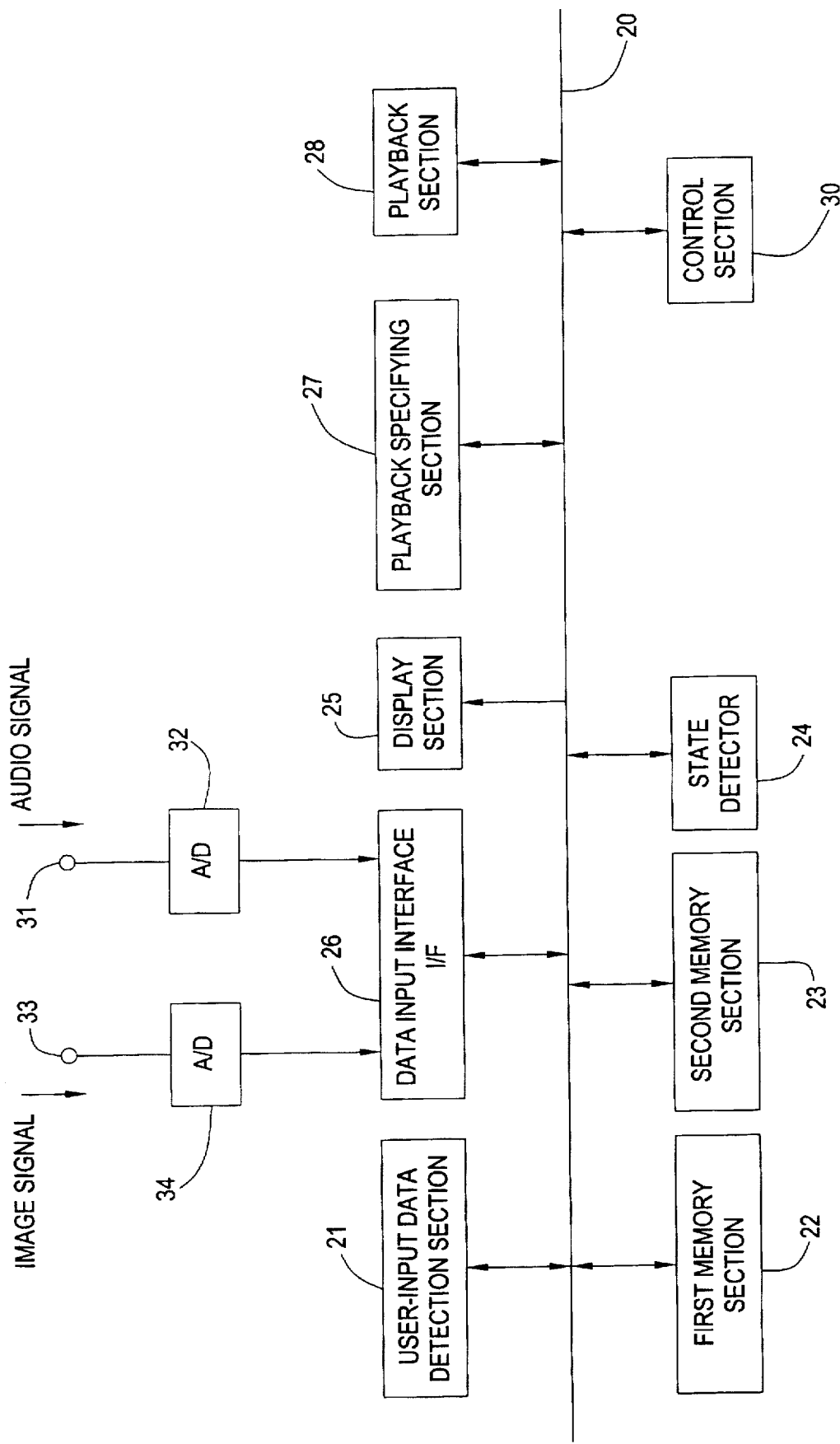
FIG. 1 is a block diagram showing the overall structure of an embodiment of the data record/playback device of the present invention.

FIG. 1 is a block diagram of the data record/playback device of this embodiment, indicating the different functions of the device. In the data record/playback device of this embodiment, a system bus 20 is connected to a user-input data detection section 21, a first memory section 22, a second memory section 23, a state detector 24, a display section 25, a data input interface 26, a playback specifying section 27, a playback section 28, and a control section 30.

Each section can be configured as separate blocks, or a single block can be configured to contain more than one processing section. Also, it is possible to have a single processing section mounted as more than one block.

Display section 25 is the projection-type display device described above.

Control section 30 controls overall operations.

User-input data detection section 21 includes tablet 12 that detects user input from electronic pen 13 and the pen data is output as user-input data. Display section 25 displays handwriting according to the pen data.

Besides handwriting and geometrical figures (objects such as lines, rectangles, circles) entered from a pen (or mouse, trackball, touch panel, or the like), user-input data can also include coded data based on character recognition of handwriting data, coded data from a keyboard, or the like. Other acceptable forms of user-input data include user-input data that does not need to be displayed. Examples include: editing data indicating moving/copying/cutting of displayed user-input data; data indicating that a page change has occurred; data indicating that the shutter of a still camera has been pressed; and data indicating the use of a virtual eraser. In these cases, a prescribed symbol indicating the presence of user-input data is displayed on display section 25.

Thus, the user can make inputs to a computational device while time-series data (such as audio or image data) is present. Both of these types of inputs fall under the category of user-input data referred to in the present invention.

First memory section 22 is the memory section in which a time-series data, such as audio data and image data, are stored. First memory section 22 can use a recording medium such as disk recording media or semiconductor memory. In this embodiment, audio and image data is stored without compression.

Second memory section 23 includes a correspondence-relation memory section, in which each piece of user-input data (pen data) is stored in association with the detection result data detected by state detector 24 near the point in time when each piece of the user-input data is detected, and a memory address in first memory section 22 for corresponding audio data and image data stored in first memory section 22. Second memory section 23 also includes semiconductor memory, magnetic disks, or the like.

State detector 24 detects data regarding circumstances near the point of time when the user-input data is detected or events occurring near the point of time when the user-input data is detected. In this embodiment, a speaker is recognized according to the extraction of features of the input audio signals from the microphone 15, and the name of the recognized speaker is transferred to the second memory section 21 as a result of detection.

In this case, an identification data ID of each meeting attendee (participant ID) is recorded as the name of a speaker in second memory section 23. Display section 25 stores a meeting participants table created by entering beforehand a name associated with a participant ID (e.g. a number) of each meeting attendee. When display section 25 receives an participant ID from state detector 24, it converts the participant ID into string data of a name and displays the name on a particular place where the connection with the corresponding user input data is explicitly shown.

Data input interface 26 is an interface for inputting time-series data. In this embodiment, audio input signals through the input port 31 are converted into digital signals by the A/D converter 32, and the digital signals are sent to data input interface 26. Also, image data through the input port 33 are converted into digital signals by the A/D converter 34, and the digital signals are sent to data input interface 26.

Playback specifying section 27 is used when stored user-input data, audio data, and image data is played back by specifying user-input data. As described later, the user can use tablet 12 to specify a piece of user-input data from the ones displayed on screen 11. Playback specifying section 27 will determine the playback portion from the specified portion.

Playback section 28 reads user-input data specified by playback specifying section 27 and state detection result data from second memory section 23 and plays the data back and displays the data on screen 11 through display section 25. Also, the audio data and image data in the playback portion corresponding to the user-input data is retrieved from first memory section 22 in accordance with memory addresses stored in second memory section 23, and played back.

The following is a description of the recording operations performed by a data record/playback device having the structure described above.

Figure 3:
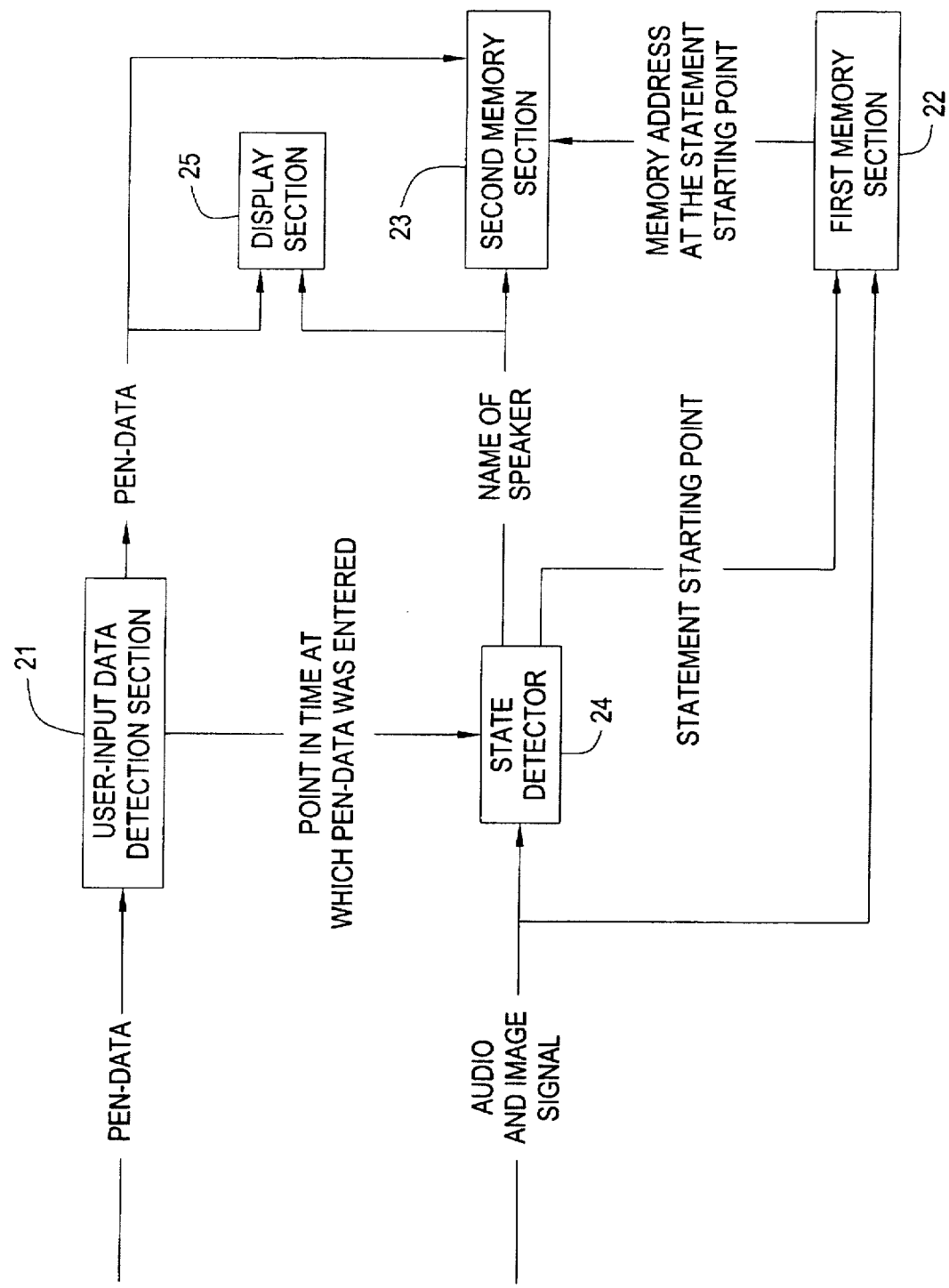
FIG. 3 illustrates a summary of the recording operation performed by the first embodiment.

FIG. 3 is a drawing describing the recording operation of this embodiment, the flow of data involved in the operation, and the flow of output from the various sections.

The audio signal from microphone 15 and the image signal from video camera 16 are sequentially stored into first memory section 22. The audio signal is also sent to state detector 24.

Figure 4:
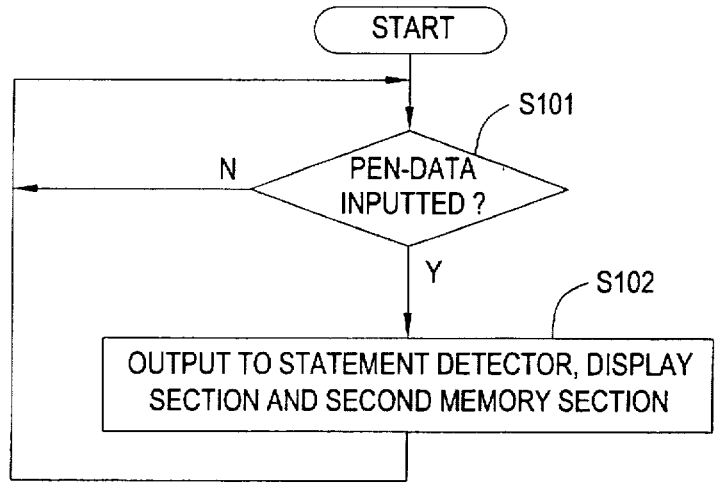
FIG. 4 is a flowchart showing an example of the operation performed by the user-input data detection section of the first embodiment.

When a meeting attendee inputs user-input data by using electronic pen 13, the user-input data is detected by user-input data detection section 21. FIG. 4 is a flowchart describing the operation of user-input data detection section 21. When tablet 12 detects user input such as handwriting data from a pen (step S101), the data from the detection result (pen data) is output and displayed to display section 25 and is also sent to second memory section 23 (step S102). Also data of time when the detected handwriting data from a pen (pen data) is inputted, is sent to state detector 24. Every time the user-input is received, these operations are repeated.

In this embodiment, as described above, state detector 24 specifies a speaker according to the input audio signals. And when user-input data is detected, state detector 24 also outputs the name of the speaker who speaks near the input of user-input data to second memory section 23. Further, state detector 24 outputs a statement starting point to first memory section 22. In this embodiment, the name of each meeting attendee and his voice are entered beforehand for the process specifying a speaker. As described above, the data record/playback device of this embodiment associates the data of the meeting attendees with the participant ID, and manage them.

Figure 5:
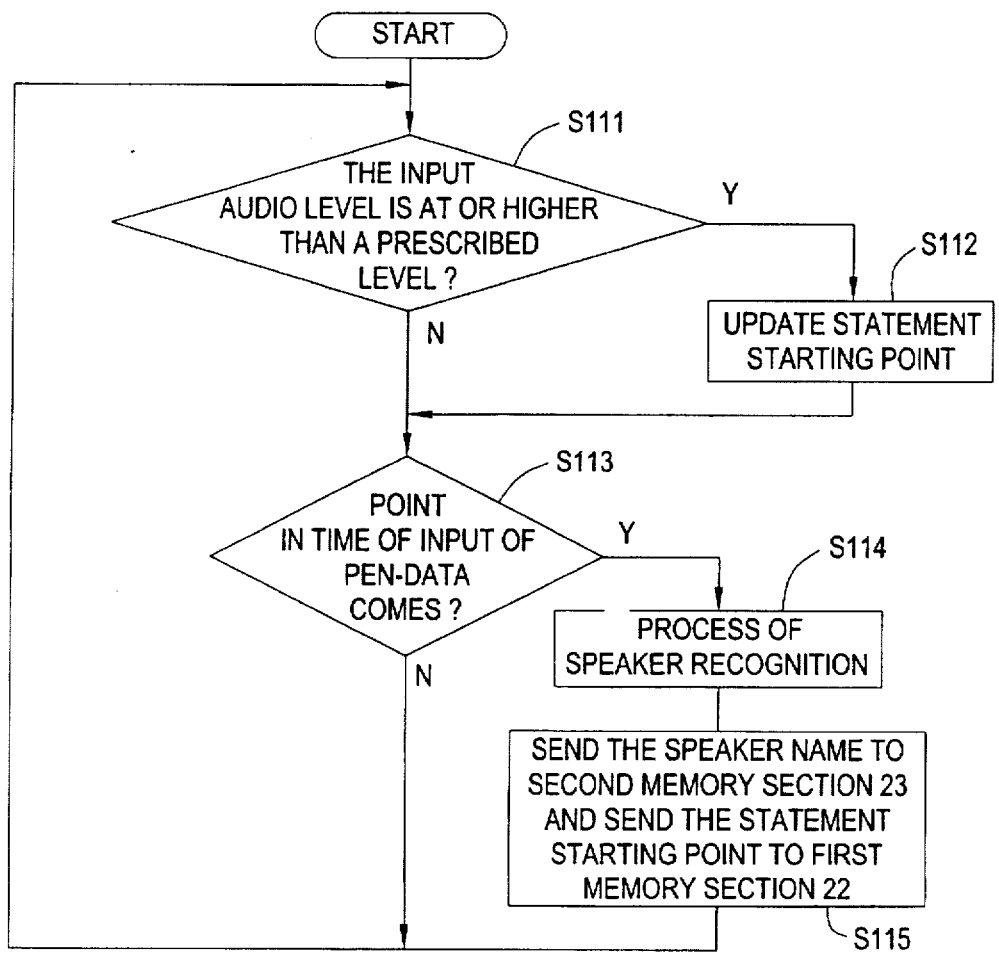
FIG. 5 is a flowchart showing an example of the operation performed by the state detector of the first embodiment.
Figure 6:
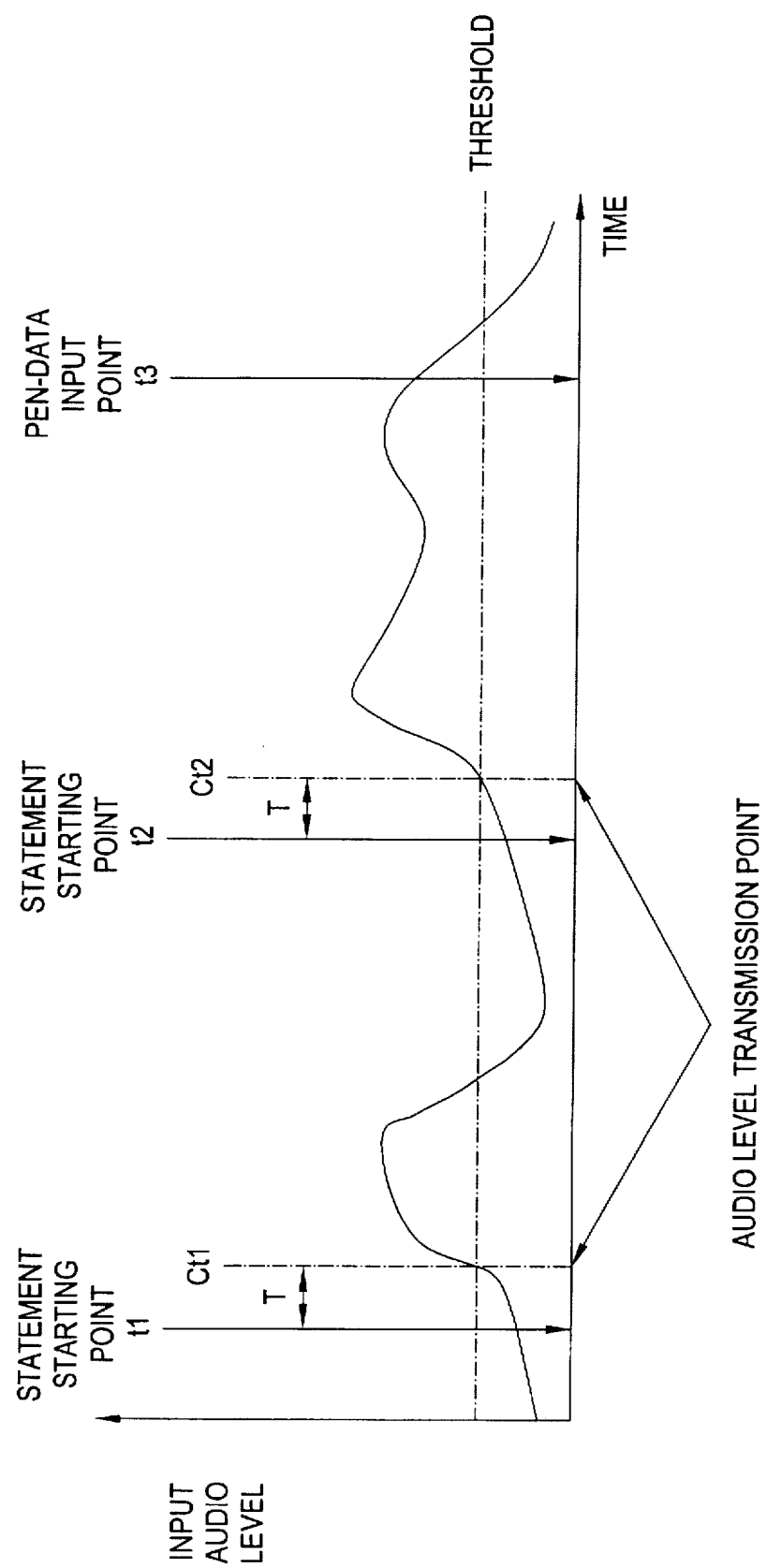
FIG. 6 illustrates a summary of the operation performed by the state detector of the first embodiment.

FIG. 5 is a flowchart describing the operations of state detector 24. FIG. 6 is a drawing describing an operation of state detector 24. The processing routine of state detector 24 is performed every fixed interval.

In this embodiment, state detector 24 recognizes the start of a statement from a speaker when the input audio level of the inputted audio data is at or higher than a prescribed level. Thus, in step S111 of the flowchart shown in FIG. 5, it is checked whether the input audio level is at or higher than a prescribed level. In this embodiment, the audio level at a point in time is considered to be the "evened-out" value of the audio levels before and after that point in time. For example, the average value of the instantaneous audio levels for the five seconds before and after the point in time can be used.

In step S111, if the input audio level is at or higher than a prescribed level, control proceeds to step S112. In step S112, the start of a statement from a speaker is recognized according to an audio level transition point, and the statement starting point stored in an internal statement starting point register (not shown in figures) is updated. However, as shown in FIG. 6, if the start of a statement is assumed to be at audio level transition points Ct1 and Ct2, where the audio level and the threshold level intersect, the initial portions of the statement will not be recorded. Thus, the statement starting points are set to points t1 and t2, which respectively precedes transition points Ct1 and Ct2 (when the audio level is changing from a low level to a high level) by a fixed interval T. And the resulting t1 and t2 are stored in the statement starting point register. Thus, the statement starting point register always stores the newest statement starting point.

After step S112, control proceeds to step S113. Also, if in step S111, it is not determined that the input audio level is at or higher than a prescribed level, control proceeds directly to step S113.

In step S113, it is determined whether a point in time of the pen-data input comes from user-input data detection section 21. If a point in time of the pen-data input comes, control proceeds to step S114 where a speaker will be recognized. Thus, a speaker is specified by comparing features of the sound signals starting from the statement starting point with the features of audio signals that is registered for each meeting attendee.

Then, control proceeds to step S115, where data regarding the name of specified speaker, such as the participant ID in this embodiment, is outputted to second memory section 23, and the statement starting point stored in the statement starting point register is outputted to first memory section 22. In this embodiment, the participant ID is also sent to display section 25. The name of the speaker is displayed near the displayed user input.

As described above, state detector 24 always performs detection of a statement starting point. When state detector 24 receives an input of pen-data, which is a detection signal of the user-input, it sends the name of the speaker to second memory section 23, and also sends the statement starting point to first memory section 22.

For example, as shown in FIG. 6, when pen-data is detected at time t3, time t2, which precedes the closest transition point Ct2 by a fixed interval T, is stored in the statement starting point register. Thus, state detector 24 determines time t2 as the statement starting point. Then, state detector 24 sends data of time t2 to first memory section 22 and sends the name of the speaker to display section 25 and second memory section 23.

This embodiment considers statement starting point t2, which is closest to the pen-input point t3 to be the statement starting point and outputs it. However, a statement starting point further away from the pen-input point t3 (the n-th closest statement starting point), such as t1, could be used as the statement starting point. It would be possible to have the user vary the "n" in the n-th closest statement starting point to be outputted as the statement starting point.

In the embodiment described above, when no sounds of statement are detected and pen-data is inputted, then the statement starting point immediately preceding the entry of pen-data is outputted. However, in such cases it would also be possible to have the user vary the "n" in the n-th closest statement starting point to be outputted to the first memory section 24.

Display section 25 receives pen-data as user-input data such as handwriting data from user-input data detection section 21 and displays the user-input data. Further, display section 25 receives data of speaker name such as a participant ID from state detector 24 and displays the speaker name at the position that shows relationship with the displayed user-input.

Figure 7:
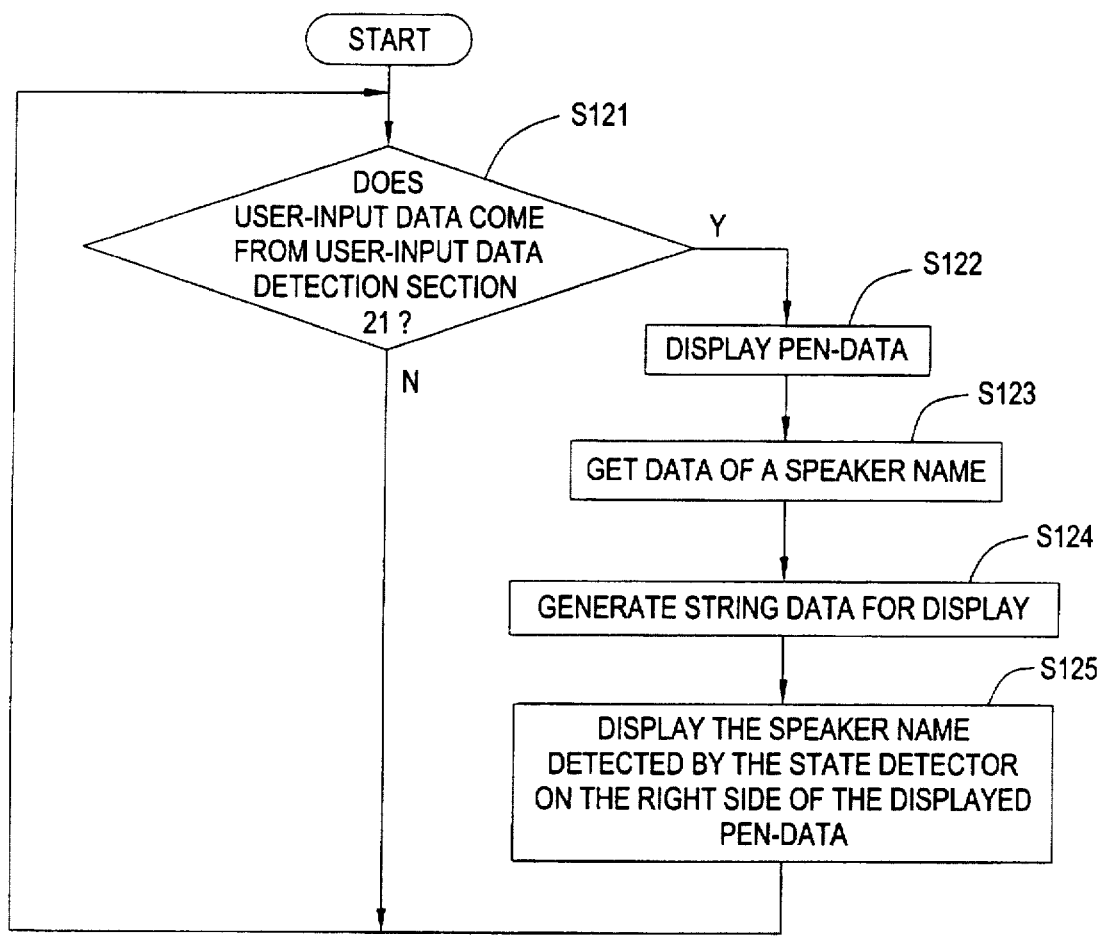
FIG. 7 is a flowchart showing an example of the operation performed by the display section of the first embodiment.

FIG. 7 is a flowchart describing the process of display section 25. In step S121, if pen-data comes from user-input data detection section 21, control proceeds to step S122. In step S122, as shown in FIG. 8, handwriting Pa from the pen data is displayed on screen 11.

After step S122, control proceeds to step S123, where display section 25 receives data of a speaker name from state detector 24. In this embodiment, a participant ID is received. Then, control proceeds to step S124. In step S124, a speaker name is determined according to the received participant ID with reference to the participant table as shown in FIG. 9, and generates the string of the speaker name for display. Then, control proceeds to step S125, where the string of the speaker name Sa generated in step S124 is displayed at the place specified by the place where the pen-data is displayed. In this embodiment the string of the speaker name is displayed on the right side of the display position of the handwriting Pa.

Display section 25 executes the process described above every time when pen data comes from user-input data detection section 21. When user-input data detection section 21 detects an input of pen data, the pen data is consecutively displayed on screen 11 in the order of input as shown in FIG. 8.

Figure 8:
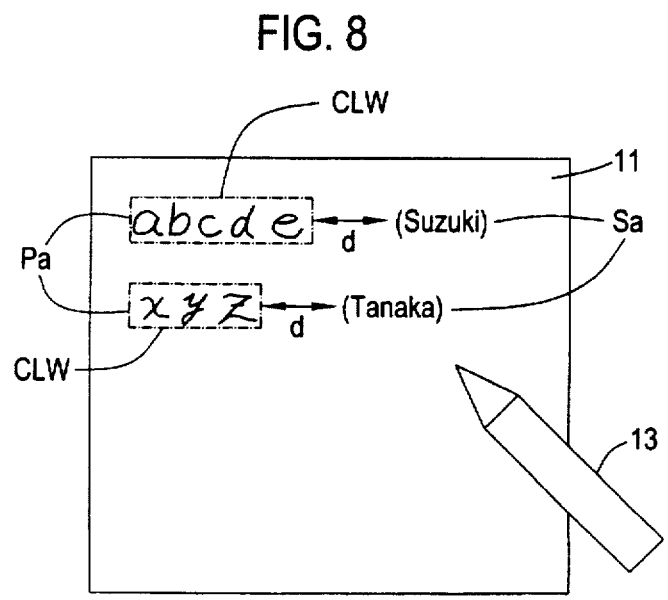
FIG. 8 shows an example of the display of the result detected by the state detector of the first embodiment.

In this embodiment, display section 25 displays handwriting Pa and the string of speaker name Sa as shown in FIG. 8. Thus, in the example shown in FIG. 8, two user inputs are received and consecutively displayed. The speaker name enclosed in parentheses is displayed on the right side of each handwriting Pa.

In such cases, display section 25 calculates an clipping frame CLW of each handwriting Pa (e.g. "abcde" or "xyz" shown in FIG. 8). A clipping frame is a minimum rectangular enclosing each handwriting Pa. Then, display section 25 displays a speaker name (e.g. "Suzuki" or "Tanaka" shown in FIG. 8) at the place that is apart from the right side of the clipping frame CLW by distance d, and is half the height of the clipping frame CLW.

First memory section 22 receives a statement starting point from state detector 24, and sends memory addresses of audio signals and image signals corresponding to the statement starting point to second memory section 23 for storing as corresponding data.

FIG. 10 is a flowchart describing the operations of first memory section 22.

First memory section 22 sequentially stores image data and audio data inputted through the interface section 26. However, as described above, this embodiment stores audio data and image data without using compression (step S131).

If there is no playback request from second memory section 23 (step S132), control proceeds to step S133. In step 133, it is checked whether data of a statement starting point comes from state detector 24 or not. If data of a statement starting point comes, control proceeds to step S134. In step 134, memory addresses of the audio data and image data corresponding to the statement starting point are outputted to the second storage section 23, and then control proceeds to step S135. Also, if it is determined in step 133 that data of a statement starting point does not come, control proceeds to step S135.

In step S135, the newest memory address is proceeded according to quantity of the stored data. Then, the control returns to step S131.

Next, the storing operations of second memory section 23 is explained. Second memory section 23 receives a pen data as user-input data from user-input data detection section 21, data of a speaker name from state detector 24, and memory addresses of audio image signals at the statement starting point from first memory section 22. Then these pieces of data are associated each other and are stored. In this embodiment, when memory addresses come from first memory section 22, this storing operation is performed.

FIG. 11 is a flowchart describing the operations of second memory section 23. When the address of the audio data and image data at the statement starting point comes from first memory section 22, second memory section 23 detects the data in step S142. Then, control proceeds to step 143. In step 143, pen data inputted by the user, data specifying the display position of the pen data on a screen, the addresses in first memory section 22 of the audio and image data that is inputted when the pen data is inputted, and the speaker name as a result of detection from state detector 24 are saved to second memory section 23.

The data specifying display position of the pen data comprises, for example, absolute coordinates or relative coordinates on X-Y coordinate axes.

Figure 12:
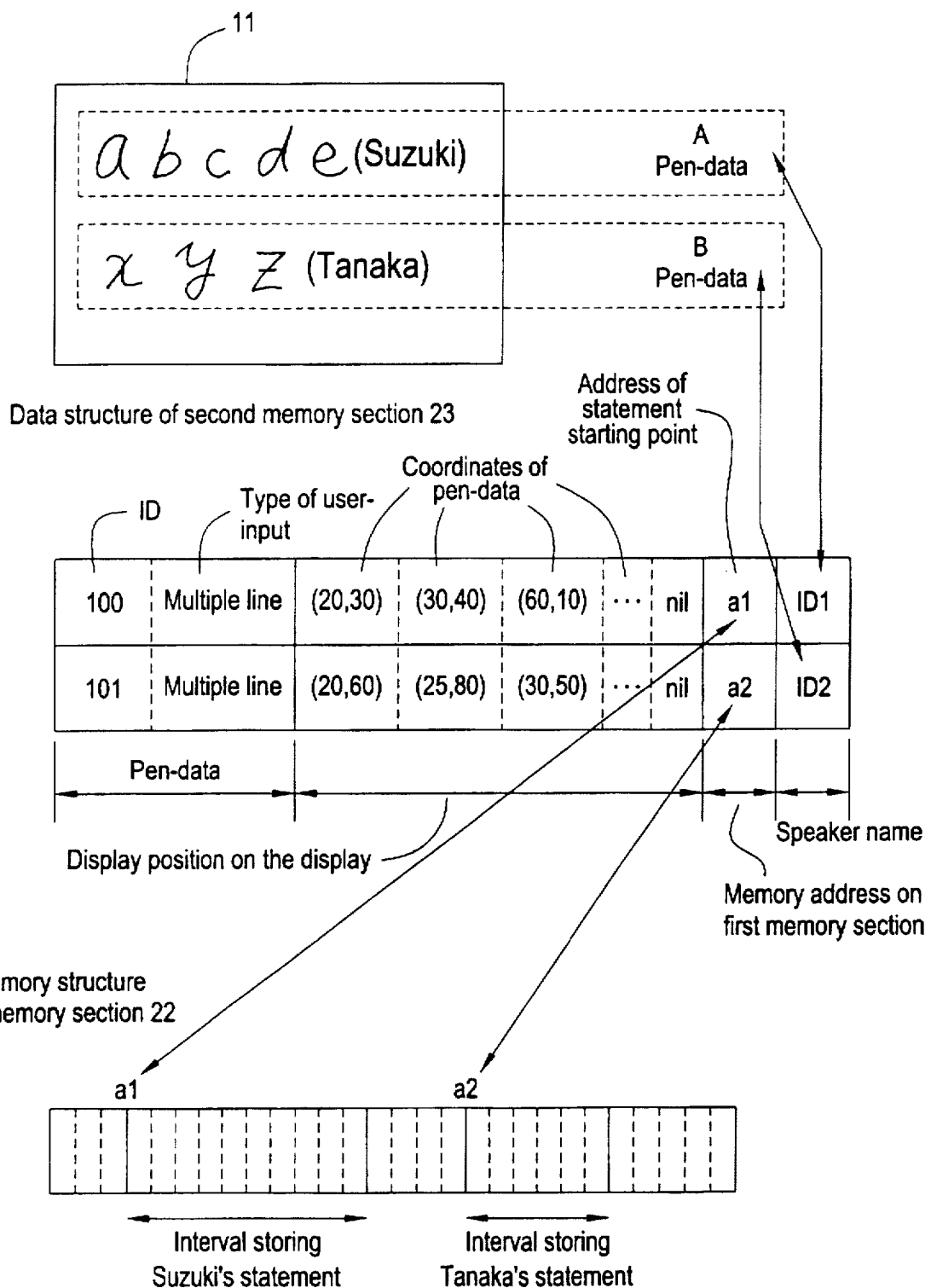
FIG. 12 illustrates association between the screen, data stored in the first memory section, and data stored in the second memory section of the first embodiment.

FIG. 12 is a drawing describing the storing operations performed by the present device. The drawings show the relationships between the image on screen 11, the data structure used in first memory section 22, and the data structure used in second memory section 23.

In the example shown in FIG. 12, like the example shown in FIG. 8, two user inputs, that is, handwriting data A and handwriting data B are inputted, and state detector 24 detects "Suzuki" and "Tanaka", which are speakers at the time of the user inputs.

In this embodiment, for the memory addresses of audio or image data in the first memory section corresponding to the handwriting data A and handwriting data B, addresses a1 and a2 of the statement starting point detected by state detector 24 are saved. Thus, as shown in FIG. 12, the memory area of audio data in first memory section 22 saves Suzuki's statement in a prescribed time starting from address a1, and Tanaka's statement in a prescribed time starting from address a2.

In FIG. 12, the data saved in second memory section 23 would appear as shown in the center of the drawing. The data structure comprises handwriting data from the pen, the display position data on display section 25, memory addresses in first memory section 22 and speaker name.

Data saved for the user's pen input comprises an ID uniquely identifying the user-input data, as well as data specifying the type of user-input data. For the display position data on display screen 3, three sets of X-Y coordinates and a nil indicating the end of coordinate data are saved. In this example, a coordinate (20, 30), a coordinate (30, 40), and a coordinate (60, 10) are used. For the memory addresses from first memory section 22, starting point addresses a1 and a2 are saved, as described above. For the data of the speaker name, as described above, participant ID is saved. (In fact, the numbers 1 and 2 are respectively saved for "ID1" and "ID2" in the figure.)

Of course, the data stored in second memory section 23 does not have to be the pen input data, display coordinates, and memory addresses themselves and can instead be identifiers that refer to this data. The data structure used in second memory section 23 also does not have to take the form of a table, and can instead be structured as a list.

In this embodiment, the pen-input data also contains data specifying the type of user-input data. A sequence of coordinate points representing multiple lines or the like is saved as a single unit of pen-input data. Thus, during playback, one of these coordinate point sequences can be specified in order to indicate the pen-input data corresponding to that sequence of coordinate points. Then, the image or audio data from that memory address can be played back.

Furthermore, a plurality of coordinate point sequences entered consecutively within a prescribed time interval can be stored as a single unit of pen-input data. This allows a line of characters to be considered as a unit of pen-input data. Any of the coordinate point sequences making up the line of characters can then be specified to playback the audio or image data from that memory address. This makes operations more convenient.

Figure 13:
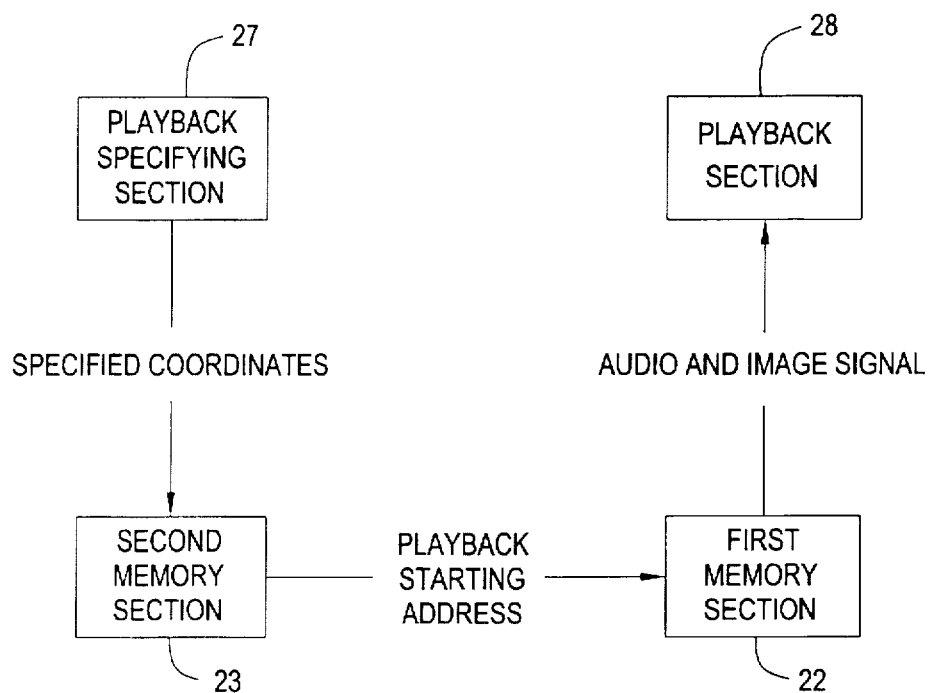
FIG. 13 illustrates a summary of the playback operation of the first embodiment.

The following is a description of the operations that take place during playback. FIG. 13 is a drawing describing the outline of the playback operation of the first embodiment, the flow of data involved in the operation, and the flow of output from the various sections.

The user uses the pen to specify (point at) one out of a plurality of pen-input data displayed on display section 25. From the audio and image signals stored in first memory section 22, only the section that was received immediately before and after the pen-input data was received is played back.

Also, from the audio and image signals entered immediately before and after the pen-input data was entered, playback can be performed beginning with the section of the audio and image signal when a speaker starts a statement.

In the case of this embodiment, the input pen also serves as playback specifying section 27, which is used for specifying playback.

Playback speciying section 27 can also comprise a mouse, a track ball, cursor keys, touch panels, or the like. Also, the method for specifying pen-input data can involve pointing, surrounding (surrounding using a closed curve or an oval), entering an ID, drawing a line under a displayed item, or the like.

If specification is performed by surrounding or underlining, and a plurality of pen-input data is selected, one of the specified items can be selected based on some sort of prioritizing. For example, automatic selection of the pen-input data that was entered earliest or the pen-input data that is displayed furthest to the left can be used.

The display positions on screen 11 are specified using X-Y coordinates. Thus, when a display position is specified using playback specifying section 27 (e.g. a pen), the X-Y coordinates corresponding to the display position is determined.

When a playback request is received from playback specifying section 27 as described above, the request is detected at step S141 from the flowchart in FIG. 11, which illustrates the operations performed with second memory section 23. Control then proceeds to step S144, where the coordinates specified by playback specifying section 27 are compared with the X-Y coordinates groups calculated from the X-Y coordinates (all the point coordinate group making up the multiple lines defined by the endpoints in FIG. 12 entered with the pen) stored in second memory section 23. Based on this comparison, the corresponding pen-input data is selected.

Next, at step S145, the playback starting address for the audio and image data corresponding to the pen-input data is specified. Then, at the next step S146, the address and a playback request are sent to first memory section 22.

First memory section 22 receives the playback starting address and the playback request. Referring to the flowchart in FIG. 10, the inputs are detected at step S132. Control proceeds to step S136, and a playback starting request including the playback starting address and the playback request is sent to the playback section 28.

When coordinate comparisons are being performed at step S144 in the flowchart shown in FIG. 11, it is possible to have slightly offset coordinates register as a match. This way, even if coordinate points that are slightly off are entered during selection, the desired memory address can be retrieved.

Also, even if the user-input data is a type of data that is not displayed, a prescribed symbol indicating the presence of the user-input data is displayed on display section 25. Thus, the desired memory address can be retrieved in the same way as described above. Furthermore, as described in the section on recording operations above, a coordinate point sequence can be linked to a single piece of pen-input data and saved to second memory section 23. In such cases, the desired memory address can be retrieved if any of the coordinates in the coordinate sequence registers a match.

Figure 14:
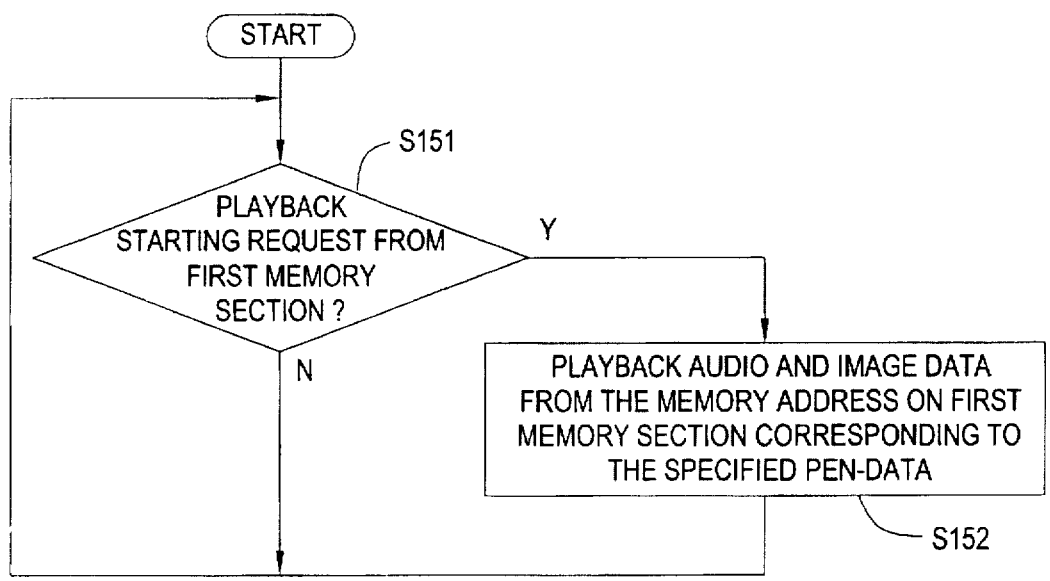
FIG. 14 is a flowchart showing an example of the operation performed by the playback section of the first embodiment.

The playback section 28 starts playing back in response to the playback starting request from first memory section 22. FIG. 14 is a flowchart describing the processing of playback section 28. When a playback starting request from first memory section 22 is detected in step S151, control proceeds to step S152. In step 152, playback section 28 begins playing back the audio signals and image signals from the specified playback starting address in first memory section 22.

During playback, it is common for the user to change the playback speed or rewind the footage a little and playback slowly. Therefore, the device of the present invention may be equipped with a fast-forward function, a rewind function, a slow-playback function, and a pause function. A slide bar indicating the time axis may be used, and the point in time that is currently being played back may be indicated by a pointer on the slider, with the user being able to specify playback positions by sliding the pointer on the slider.

Playback speed does not have to be implemented to coincide with the timing used in recording. It would be possible to maintain the sequential relationships within the footage while playing back the data at a faster speed. It would also be possible to playback, with dropped frames, only the intervals in which a speaker is making a statement. Furthermore, it would also be possible, after a pause in playback, to have playback specifying section 27 indicate the position where playback should be resumed. New user-input data can be added as well.

As described above, according to the first embodiment, when audio and image data is recorded, pieces of user-input data are sequentially displayed on screen 11. Further, the name of the speaker who speaks around the time each piece of the user-input data is entered is displayed corresponding to the display position of each piece of the user-input data. Thus, a speaker who speaks on the handwriting data as a user-input is known by seeing the screen.

After the data storing process is finished, the desired portion of audio and image data can be retrieved by selecting one of the pieces of user-input data while seeing the screen and using the speaker name as a cue for retrieving. For example, it is easy to retrieve comments from a particular speaker. Further, it is easy to perform a grouping operation such as retrieving all portions of audio data from a specific speaker and portions of image data recording circumstances while the speaker is speaking.

In the embodiment described above, a speaker name, which is a detection result from state detector 24, is displayed on the right side of handwriting data as a user-input. However, the display position of a detection result from state detector 24 is not restricted to the right side of the handwriting data. Thus, every way in which correspondence between each handwriting data and each detection result from state detector 24 is explicitly shown on the screen can be accepted. For example, it would be possible to display a speaker name on the right, left, top or bottom position adjacent to the handwriting data. It would be also possible to display only reference number (e.g. a participant ID) at the position adjacent to the handwriting data and the correspondence between the reference number and a speaker name is displayed as a footnote or in a blank. Further, it would be possible not to display a detection result from state detector 24 usually and to display it when the user requests.

Further, in the embodiment described above, a string indicating a speaker name is displayed as a detection result from state detector 24. However, this is not restricted to a speaker name. Everything that can specify a speaker is allowed as a detection result from state detector 24 to be displayed on display section 25. For example, it would be possible to display a picture of a speaker, a portrait of a speaker or a mark for identifying a speaker.

In addition, it would be possible to display elapsed time of speaking or time starting a statement as well as the data specifying a speaker, such as a speaker name or a picture of a speaker.

Further, in the embodiment described above, state detector 24 identifies a speaker by recognizing characteristics of the audio signals (e.g. a voiceprint) starting with statement starting point. However, the method used to identify a speaker is not restricted to that. For example, it can involve identification based on the facial and mouth motions of the speakers determined from the image data. Also plural microphones can be set up. Then, the audio signals from the plural microphones can be analyzed, and the position of the sound source can be determined to identify the speaker. In order to analyze audio signals, individual microphones can be set up for each speaker. Then, the audio input levels from each of the speakers microphones can be compared, and the phase differences between the audio signals can be analyzed. Further, it would be possible to assign a speaker's button for each participant to explicitly inform state detector 24 of the speaker.

Further, in the embodiment described above, one speaker is detected for each piece of user-input data and his name is displayed. However, it would be possible to identify plural speakers corresponding to a piece of user-input data, and to display the names of the plural speakers in association with the user-input data.

When received audio and image signals are stored in first memory section 22, it would be possible to compress the audio and image signals before storing. In such cases, the following method can be used for compression of the image signal: intra-frame compression; recording interruptions; dropping color data; and dropping brightness data. In particular, compression of moving images can be performed by using intra-frame compression and inter-frame compression. Intra-frame compression can be performed by using vector quantization and discrete cosine transformations. Interframe compression can be performed by recording only the differences in the image data between sequential frames. The following method can be used for compression of the audio signal: reducing sampling frequency; reducing number of encoding bits; and reducing number of channels.

The events that can be detected by state detector 24 in the above-described first embodiment are not restricted to the specification of speaker. Other events that can be detected include: presence of audio input; a change of speakers; the appearance in the audio signal of key words entered beforehand; the appearance in the audio signal of audio patterns entered beforehand; the appearance in the image signal of a sequence of characters entered beforehand; a state of the image signal; a state detected by an external sensor; a state of camerawork signal; or the like. In other words, state detector 24 used in this invention can detect a state in the multimedia data input (e.g. audio or image signals), or that detects a state in a signal from an external sensor while multimedia data input is present.0132[Second embodiment]

In the first embodiment described above, when user-input data detection section 21 detects user-input data, the detection result from state detector 24 is displayed on the display position specified by the display position of the user-input data. Meanwhile, in the second embodiment, the user-input data is displayed in a variety of formats according to the detection result from state detector 24 when user-input data detection section 21 detects an input of user-input data. The other is the same as the first embodiment.0133

In this embodiment, as an example of a method in which user-input data is displayed in a variety of display formats, the user-input data is displayed in a variety of colors according to the speaker detected by state detector 24.

The data record/playback device of the second embodiment basically has the same configuration as that shown in FIG. 1. However, user-input data detected by user-input data detection section 21 is character data inputted from a keyboard. State detector 24 identifies a speaker by extracting the features of audio signals.

In the second embodiment, user-input data detection section 21 recognizes plural characters entered consecutively from a keyboard within a prescribed interval as a single unit of string data (user-input data).

The input speed is dependent on the user's typing skill. Therefore, it would be possible to have the user vary the prescribed interval. Further, when the line feed key is inputted, a string starting with the character after the line feed can be treated as a separate string, even if the strings are inputted consecutively within a prescribed interval.

As described above, a string entered consecutively within a prescribed interval is considered as a string. Thus, while playback of the audio and image signals, any of the characters making up the string can then be specified to play back the audio and image signals from that memory address. This makes operations more convenient.

Figure 15:
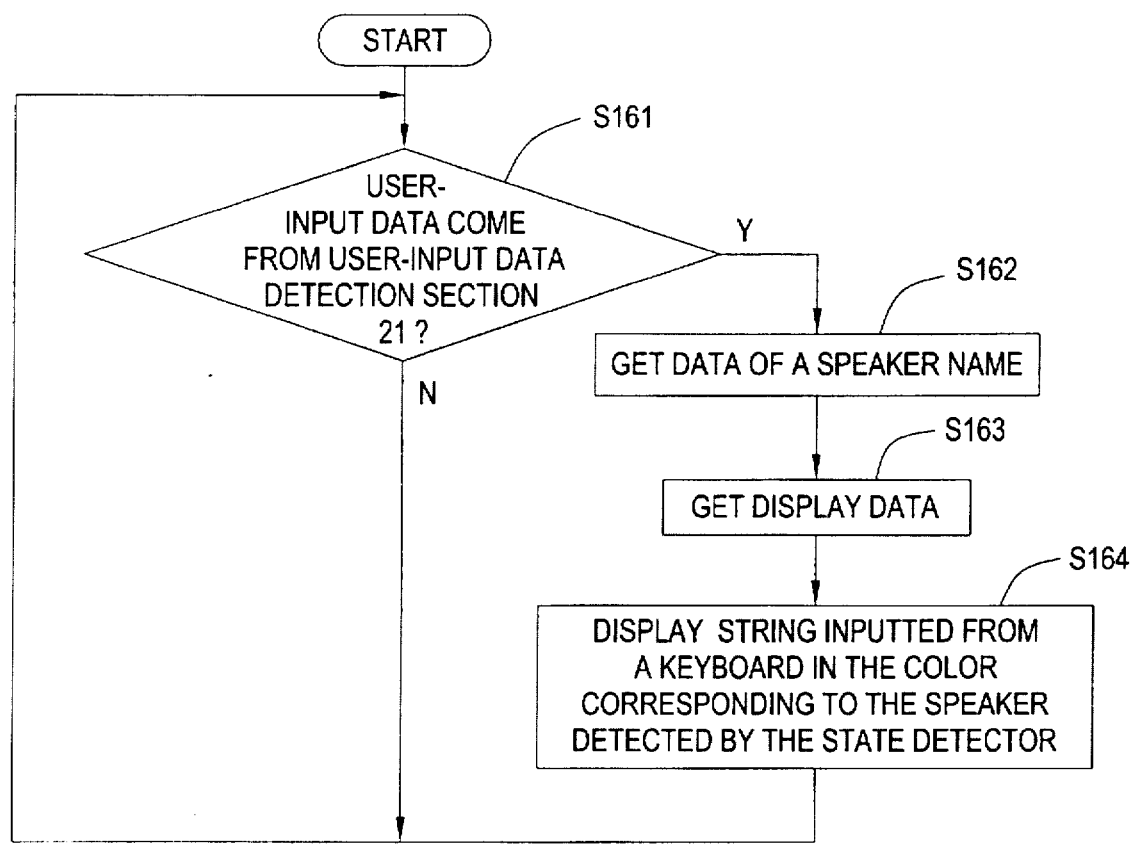
FIG. 15 is a flowchart showing an example of the operation performed by the display section of the second embodiment.

FIG. 15 is a flowchart describing display process of display section 25 in this embodiment.

In step 161, when string data comes from user-input data detection section 21, control proceeds to step S162. In step 162, data of speaker name is waited and is obtained from state detector 24. In this embodiment, a participant ID is obtained. Then, control proceeds to step 163, where a display string in a variety of colors is created. Each color corresponds to each speaker.0139

In this embodiment, a participant table shown in FIG. 16, which associates each meeting attendee with a color, is prepared beforehand. For example, Suzuki is associated with blue, and Tanaka is associated with green. In step 163, the color of character for a speaker specified by a participant ID come from state detector 24 in step S161 is determined with reference to the participant table. Then the display string obtained in step S161 is generated in the determined color. In addition, in step S163, a explanatory note that shows a correspondence between a color and a speaker is generated.

Then, control proceeds to step S164. In step S164, a display string LT of the string data as user-input data is displayed on screen 11 as shown in FIG. 17. In addition, a explanatory note INDX for associating a color of character with a speaker is displayed on the right bottom of screen 11. In this figure, difference of the density of the shade indicates the difference of colors. "-3-" shown near the explanatory note INDX is a page number.

Display section 25 performs the process described above every time when string data comes from user-input data detection section 21.

Thus, when user-input data detection section 21 detects a string inputted from a keyboard, the string is consecutively displayed on screen 11 in the order of input. Then, as shown in FIG. 17, in each page, a explanatory note INDX corresponding to the used character color is displayed as a footnote.

FIG. 18 illustrates the data structure of second memory section 23. In this embodiment, second memory section 23 stores the following: the string data inputted by the user; the data specifying the display position of this string; the memory address in first memory section 22 of the audio or image signals that is received when the string data was entered; and the data specifying a speaker (participant ID, in this embodiment).

In this embodiment, same as the first embodiment, the data structure used in second memory section 23 also does not have to take the form of a table shown in FIG. 18, in which data is separately stored for each user-input string, and can instead be structured as a list.

Further, a method used for varying the character display format of a string as user-inputs data for speakers is not restricted to the method that varies colors of characters. Instead, it would be possible to use a method that assigns a character font, a character size, a type of underline, a type of shade or the like to each speaker (meeting attendee) and varies them.

Furthermore, it would be possible to vary an attribute regarding a layout according to a speaker. Examples of the attribute regarding a layout are: line spacing; character spacing; indention width (tabulation width); or the like. It would also be possible to take a method varying a character display format. For example, a string inputted from a keyboard is displayed by indenting with a indentation width corresponding to each speaker. Further, a display format other than the character display format can be used. When user-input data is pen data, a type or thickness of pen data can be varied according to a speaker.

As described above, by the second embodiment, instead of displaying a speaker name detected by the state detector, user-input data is displayed using a variety of formats, each of which corresponds to each speaker. Thus, it is avoided to complicate a screen, as compared with a case displaying a speaker name on screen 11.

|Third embodiment|

The third embodiment is provided with an editing section for correcting a detection result from state detector 24 in addition to the configuration of the first embodiment. Thus, when a speaker name that is erroneously recognized is displayed on screen 11, this embodiment allows the user to correct the erroneous speaker name.

Figure 19A:
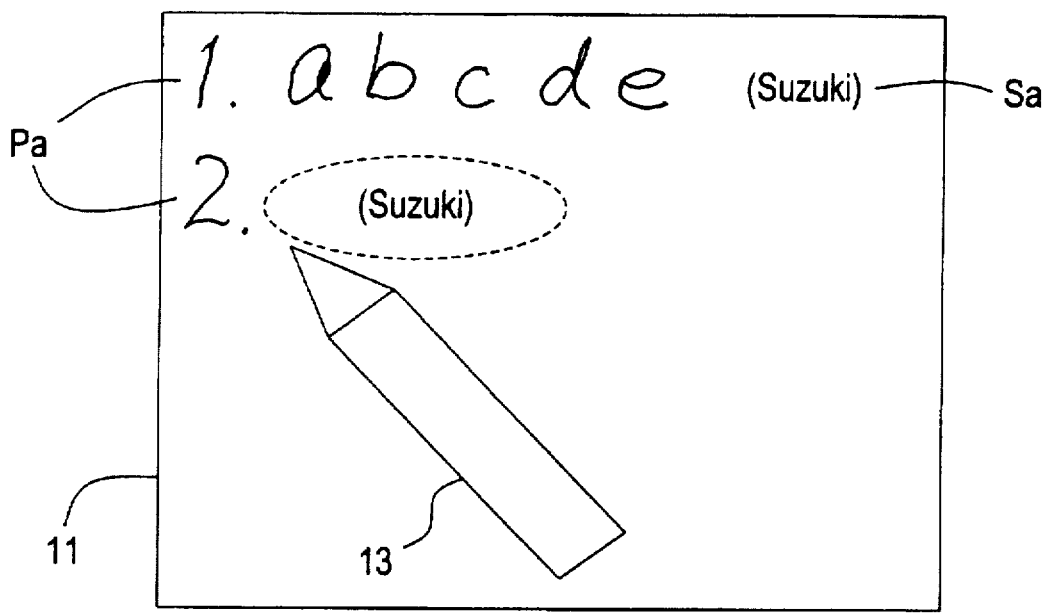
FIGS. 19A–19B shows an example of the editing of the third embodiment.
Figure 19B:
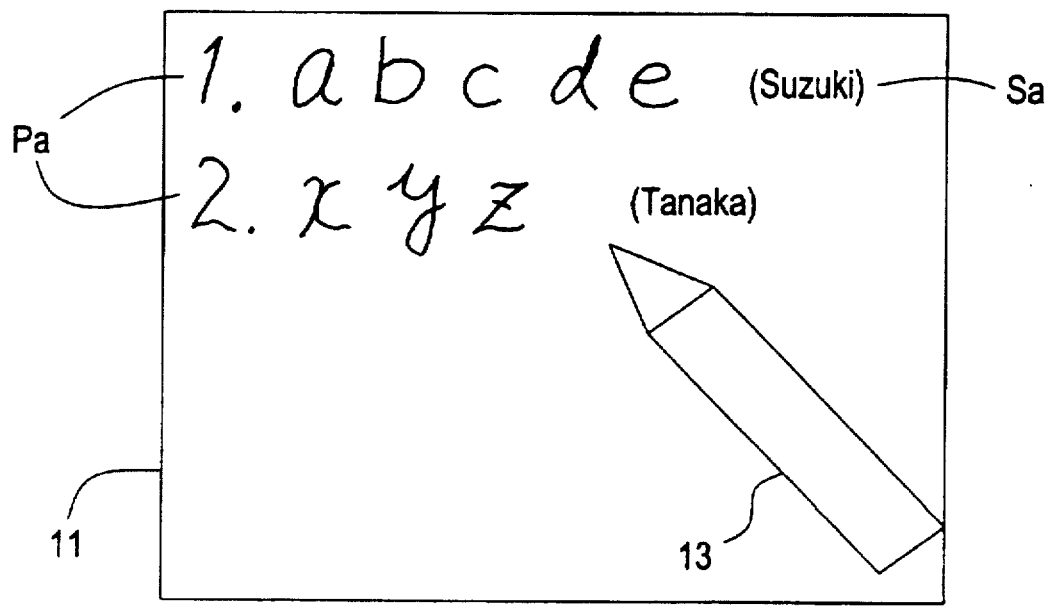

For example, as shown in FIG. 19B, the user tried to input "2.xyz" by using an electronic pen. But, as shown in FIG. 19A, the user stopped inputting after the input of "2.". Then, user-input data detection section 21 recognizes it as pen-data of user-input data, and send the data at the time of pen input to state detector 24. State detector 24 recognizes the speaker at that time, and send the resulting speaker name to display section 25. Thus, display section 25 displays the speaker name at the right side of the pen data "2.".

However, in FIG. 19A, an area enclosed by a broken-line circle is a position, where "xyz" originally entered by the user after the input of "2." should be displayed. Thus, when a speaker name, which is a detection result from state detector 24, is displayed on the position where originally user-input data should be inputted, it is troublesome to erase the displayed detection result explicitly.

In the third embodiment, display section 25 is equipped with the following editing rule: "when the displayed detection result from state detector 24 is overwritten by new user-input data, the detection result from state detector 24 is automatically deleted."

FIG. 20 is a flowchart showing a process of display section 25 provided with the editing rule. In step S171, if pen-data comes from user-input data detection section 21, control proceeds to step S172. In step S172, it is checked whether the speaker name displayed on screen 11 is overwritten by the pen-data. If it is not overwritten, control proceeds to step S174. If it is overwritten, control proceeds to step S173. In step S173, the displayed speaker name is eliminated from the screen, and control proceeds to step S174.

In step S174, as shown in FIG. 19, the handwriting Pa is displayed on screen 11. After step S174, control proceeds to step S175, where a speaker name is received from state detector 24. In this embodiment, a participant ID is received. Then, control proceeds to step S176. In step S176, according to the participant ID, a speaker name is specified with reference to the participant table as shown in FIG. 9, and display string data is generated. Then, control proceeds to step S177. In step S177, the display string Sa generated in step S176 is displayed on the display position specified by the display position of the pen data. In this embodiment, it is displayed on the right side of the handwriting Pa.

Display section 25 performs the process described above every time when string data comes from user-input data detection section 21.

By the process described above, while displaying an image as shown in FIG. 19A, when the user writes on a speaker name "Suzuki" by using an electronic pen 13, the speaker name "Suzuki" is deleted and "xyz" inputted by using a pen is displayed as shown in FIG. 19B.

Instead of the editing rule as described above, the following rule can be used: when the user writes new user-input data on the displayed detection result from state detector 24, the image of the erroneous detection result from state detector 24 is automatically canceled, and the original image is recovered.

Further, in the process of recognizing a speaker, plural speakers are obtained as a interim result. The obtained interim result can be stored in the second memory 23. It would be possible to display second candidates for speakers on screen 11 according to the interim result of speaker's recognition stored in second memory section 23 when a correction request is entered by the user, and to select the correct speaker therefrom. In this selection process, a ratio of correctness, which is also an interim result of the speaker recognition process performed by state detector 24, is referred to.

In the third embodiment, a speaker name is displayed as a detection result from state detector 24, which corresponds to user-input data. However, instead of displaying a speaker name, it would be possible to apply this method to the device in which a display format is varied according to the speaker detected by state detector 24. In such cases, for example, an erroneous display format of user-input data, which is caused by the stop of pen-input from the user, is corrected later, when the user restarts inputting by using a pen.

|Fourth embodiment|

In the first embodiment, a detection result from state detector 24 is displayed on screen 11 when user-input data is detected. But the detection result from state detector 24 is not necessary to be displayed when the user-input data is detected. In the second embodiment, user-input data is displayed in a variety of display formats according to the detection result from state detector 24, when the user-input data is detected. But it is not necessary to vary the display format of the user-input data when the user-input data is detected.

In the fourth embodiment, a detection result from state detector 24 is not usually displayed on screen 11. Instead, it is displayed when a request is inputted. The other is the same as the first, second or third embodiment.

In this embodiment, user-input data is character data comes from a keyboard. State detector 24 identifies a speaker according to the feature extraction of audio signals.

In playback specifying section 27, the user designates user-input data by using a mouse.

Figure 21:
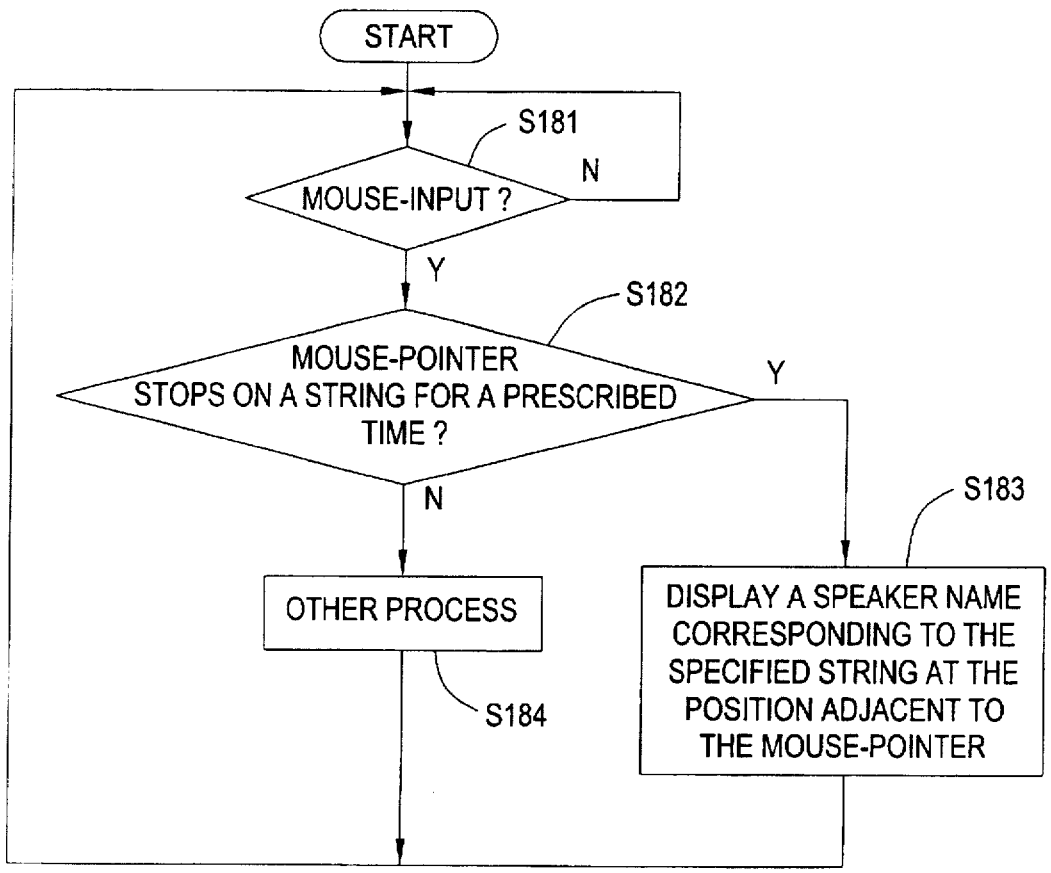
FIG. 21 is a flowchart showing an example of the operation performed by the display section of the fourth embodiment.

In the fourth embodiment, when a mouse pointer stops on the displayed string data for a given time or more on screen 11, the string data is designated. FIG. 21 is a flowchart describing the process of display section 25 in the fourth embodiment.

In step S181, when a mouse-input is detected, control proceeds to step S182. In step S182, it is checked whether a mouse pointer, which indicates a position pointed by a mouse, stops on a string displayed on screen 11 for a prescribed time. When it is not determined in step S182 that the pointer stops on a string for a prescribed time, control proceeds to step S184. In step S184, another process is performed according to a mouse-input.

When it is determined in step S182 that the mouse pointer stops on a string for a prescribed time, control proceeds to step S183. In step S183, the speaker name corresponding to the designated string is displayed at the position adjacent to the mouse pointer. The speaker name is determined with reference to the participant data stored in second memory section 23.

Figure 22:
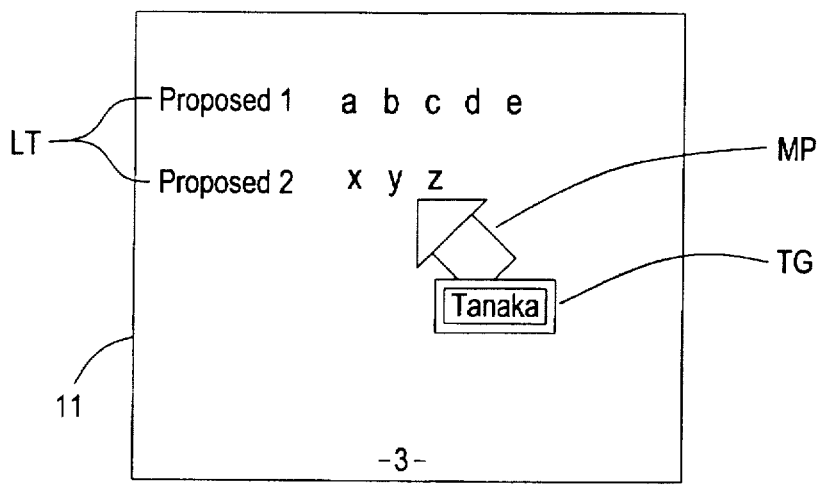
FIG. 22 shows an example of displayed image of the fourth embodiment.

FIG. 22 is an example of screen image. In this example, a name image TG of Tanaka, who speaks at the time a string "xyz" is inputted, is popped up when the mouse pointer MP stops on the string LT of "xyz" for a prescribed time.

Instead of a mouse, the following things can be used for designating a string to display a speaker name corresponding to the string as user-input data: a electronic pen using for inputting user-input data; a track ball; a cursor key; a touch panel; or the like. Further, instead of pop-up display, a speaker name can be displayed as a footnote.

Further, it would be possible to use a method without specifying any user-input data. For example, a button can be provided for making all detection results from state detector 24 included in the displayed page be displayed. Further, another button can be also provided for making all displayed detection results from state detector 24 included in the displayed page be undisplayed.

In the fourth embodiment, only when user-input data is designated by the user, a detection result from state detector 24, which is detected when the designated user-input data was inputted, is displayed. Therefore, a detection result from state detector can be displayed only when the user inputs a request. Thus, it is avoided that a detection result from the state detector complicate a screen image.

[Fifth embodiment]

Data record/playback system of the fifth embodiment basically has the configuration same as that shown in FIG. 1. However, state detector 24 detects data indicating circumstances or an occurring event, which is different from that of the first through fourth embodiment. The other is the same as those of the embodiments described above.0170

In the fifth embodiment, state detector 24 detects the appearance of a keyword entered beforehand in the incoming audio signal. In this embodiment, the following keywords are entered beforehand: "homework"; "action item"; "topic"; "conclusion"; "decision"; "important"; "summary"; or the like.

Figure 23:
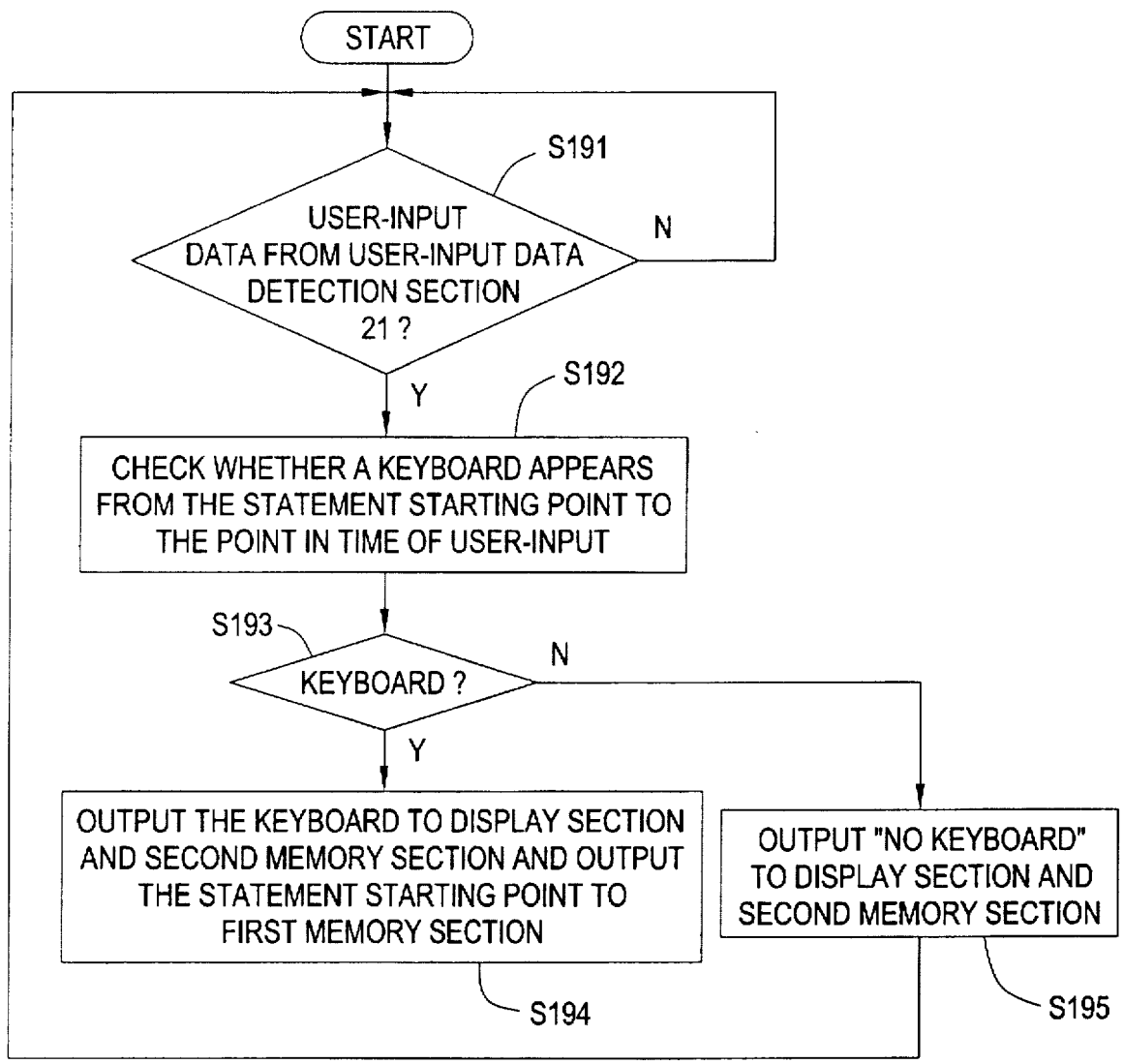
FIG. 23 is a flowchart showing an example of the operation performed by the state detector of the fifth embodiment.

State detector 24 uses audio recognition to continuously convert the incoming audio signal into string data. Through analysis of morphemes or the like, phrases are extracted from the string data. The extracted phrases are then compared with the keyword strings entered beforehand to detect a keyword. FIG. 23 is a flowchart describing the process of state detector 24 in this embodiment.

In step S191, when state detector 24 receives data indicating detection of user-input (in the first embodiment, a point in time of pen-data input) from user-input data detection section 21, control proceeds to step S192. In step S192, it is checked to see whether any of the string keywords entered beforehand appears in the audio signals within an interval starting with the statement starting point specified by the point in time of pen-data input and ending with the point in time of pen-data input. In this case, as described in the first embodiment with reference to FIG. 6, the statement starting point can be the closest statement starting point to the user-input point or the n-th closest statement starting point further away from the user-input point. The "n" in the n-th closest statement starting point is specified by the user.

As a result of keyword detection in step S193, when one of the keywords entered beforehand was detected, control proceeds to step S194. In step S194, state detector 24 sends the data of the detected keyword to display section 25 and second memory section 23, and sends the specified statement starting point to first memory section 22.

As a result of keyword detection in step S193, when no keyword strings entered beforehand is detected, control proceeds to step S195, where data indicating no-detection is sent to display section 25 and second memory section 23. State detector 24 performs the process described above every time when data indicating detection of user-input is received.

FIG. 24 is a flowchart describing the process of display section 25 in this embodiment. In step S201, when display section 25 receives user-input data from user-input data detection section 21, control proceeds to step S202. In step S202, the received user-input is displayed on screen 11 as handwriting Pa, or the like.

After step S202, control proceeds to step S203, where it is checked whether state detector 24 detects a entered keyword or not. That is, it is checked whether either keyword data or data indicating no-detection of keyword comes from state detector 24. Then, if the keyword data comes, control proceeds to step S204. In step S204 the coming keywords are displayed on the display position specified by the display position of the user-input data. In this embodiment, it is displayed on the right side of the pen-data.

If the data indicating no-detection of keyword comes in step S203, keywords are not displayed, and the control returns to step S201. In such cases, it would be possible to display a mark that indicates no-detection.

On screen 11, it would be possible to display a mark indicating detection of keywords, instead of the string of a keyword. Further, it would be also possible to display only a keyword that appears more than a prescribed number.

Further, state detector 24 can detects a voice pattern that is entered beforehand, instead of an audio keyword. For example, there are cases where the use of audio recognition to detect keywords may be difficult, but certain characteristic audio signal patterns such as patterns indicating laughter, patterns indicating applause, or patterns indicating excited conversation can be recognized by using a known pattern recognition technology, such as a technology that analyzes the changes over time of the power or frequency components of an audio signal.

For example, it can be determined that excited conversation is taking place if the interval between the end of a statement from one speaker and the beginning of a statement from another speaker is short. Also, characteristic audio signal patterns are entered beforehand, and these patterns are compared with audio signal patterns extracted from the continuously incoming audio signal. The rate of recognition for the pattern recognition can be increased by entering separate audio patterns for each speaker.

In this embodiment, when user-input data detection section 21 detects an input of user-input data, it is checked whether one of the audio signal patterns entered beforehand appears in the audio signals within the interval starting with the statement starting point specified by the point in time of user-input and ending with the point in time of user-input. When the appearance of one of the audio signal patterns entered beforehand is detected, a mark or a string indicating appearance of the audio signal pattern is displayed on the display position specified by the display position of the user-input data.

Figure 25A:
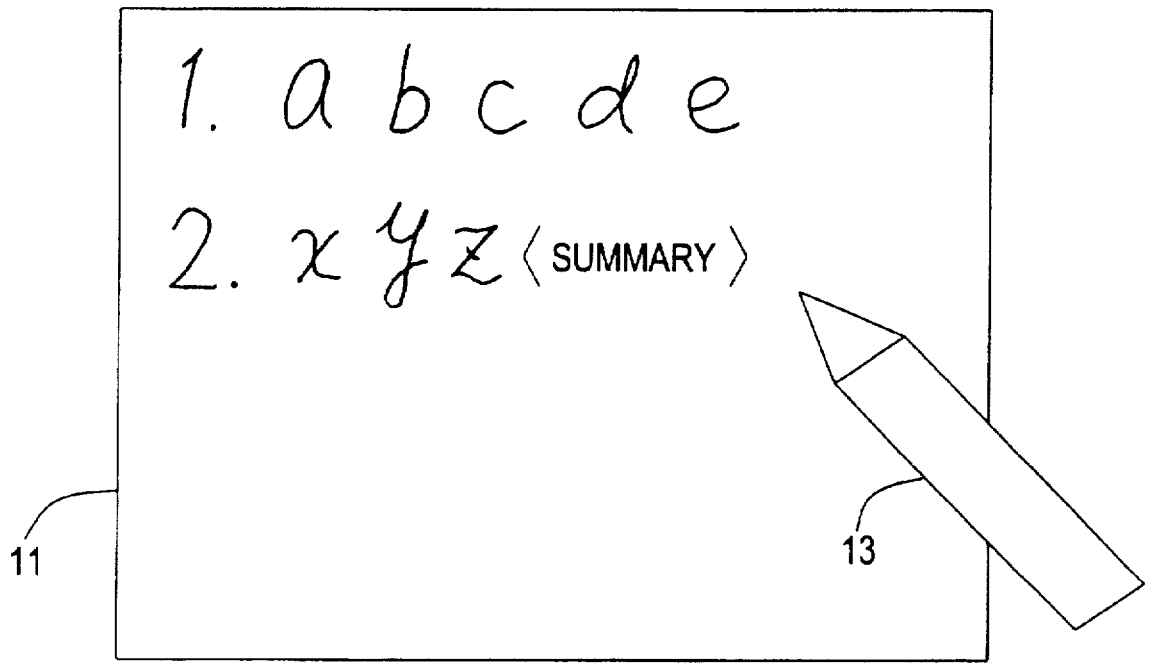
FIGS. 25A–25B shows an example of displayed image of the fifth embodiment.
Figure 25B:
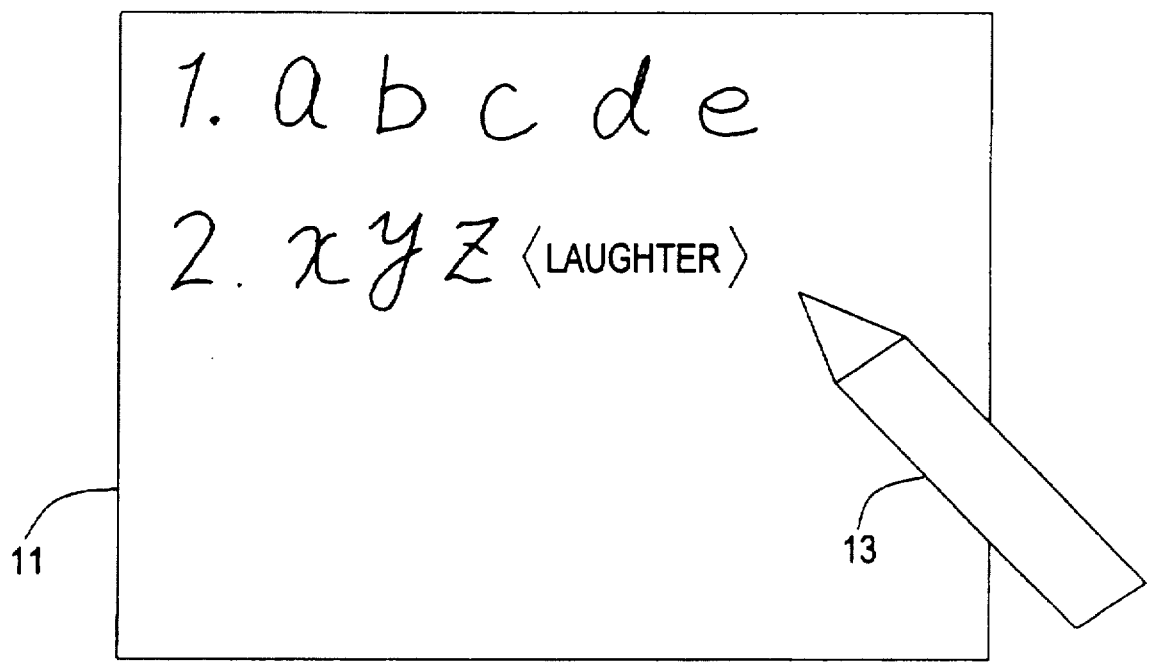

FIGS. 25A and 25B are examples of screen images displayed on screen 11 in the fifth embodiment. FIG. 25A is an image when a keyword "summary" is detected in audio signals. FIG. 25B is an image when an audio signal pattern "laughter" is detected in audio signals.

In the fifth embodiment, state detector 24 detects the appearance of keywords or audio signal patterns entered beforehand in the incoming audio signals. Thus, keywords or audio signal patterns that appears in audio signals can be displayed. Then, audio or image signals are retrieved by using the display as a cue.

[Sixth embodiment]

In the fifth embodiment described above, state detector 24 detects the appearance of keywords or audio signal patterns entered beforehand in the incoming audio signals. Instead, in the sixth embodiment, state detector 24 detects the appearance of a keyword string entered beforehand in the incoming image signal.0185

In the sixth embodiment, state detector 24 uses image recognition to continuously convert characters written on a whiteboard or the like, and phrases are extracted from the string data. The extracted phrases are compared with keyword strings entered beforehand such as "homework", "action item", "topic", "conclusion", "decision", "important", and "summary" in order to detects a keyword.

If an electronic whiteboard displaying the output from a computer is used, and the displayed image signal is the output from the computer, then the data from the computer (character code data and the like) can be used as the incoming image signal.

In this embodiment, when user-input data detection section 21 detects input of user-input data, state detector 24 checks to see whether an extracted phrase matches one of the keyword strings entered beforehand. If an extracted phrase matches one of the keyword strings entered beforehand, the keyword string is displayed on the display position specified by the display position of the user-input data.

This embodiment saves keyword intervals corresponding to the keyword strings in the table as shown in FIG. 26A in state detector 24. The keyword intervals determine how long the detection will be valid after the detection of the keyword string. If, during the keyword interval, no user-input data is detected, then state detector 24 does not send the keyword to display section 25 and second memory section 23. Thus, the keyword is not displayed on screen 11.

Instead of an keyword string, it would be possible to display a mark indicating the number of appearances of the keyword on screen 11. Further, it would be also possible to display only the keyword that appears more than a given number of times in a single time unit.

Instead of detecting keyword strings in the image signal, the state detector can detect a characteristic state entered beforehand in the image signal. For example, there may be cases where it is difficult to detect keyword strings using image recognition, but changes in the state of the incoming image data, such as movement, changes in brightness, and changes in color distribution, can be detected.0191

The recognition of additions or page changes made while a whiteboard or a drawn image is being recorded, can be achieved by using known technologies for detecting inter-frame differences, such as the one disclosed in Japanese laid-open publication number 4-286293. While a meeting is being recorded, lighting of OHP or projectors can be recognized by detecting the change of brightness. The state patterns are entered beforehand, and are compared with state in the image signals extracted from the continuously incoming image signals.

Thus, in this embodiment, when user-input data detection section 21 detects an input of user-input data, state detector 24 checks whether an extracted image signal pattern matches one of the image signal patterns entered beforehand. If an extracted image signal pattern matches one of the image signal patterns entered beforehand, a mark indicating the appearance of the image signal pattern is displayed on the position specified by the display position of the user-input data.

This embodiment also saves pattern intervals corresponding to the image signal patterns in the table as shown in FIG. 26B in state detector 24. The pattern intervals determine how long the detection of an image signal pattern will be valid after the detection of the image signal pattern. If, during the pattern interval, no user-input data is detected, the mark indicating the appearance of the image signal pattern is not displayed.

[Seventh embodiment]

In the seventh embodiment, state detector 24 detects camerawork (camera operation) or changes in camerawork. The other parts of the configuration are the same as those of the first through fourth embodiments.

For example, the recording of a zoom-up of a person may indicate that the images are important, and in many cases, it would be desirable to save the audio or image signals using high audio quality/high image quality during the interval in which the camera is zoomed in.

In the seventh embodiment, state detector 24 detects camerawork, such as panning of the camera, tilting, zooming, booming, trimming, dollying, beginnings of cuts, and ends of cuts. The camerawork is detected in the image signals coming from a camera. The camerawork detection can be achieved by using the image recognition of the inputted image signals, or detection of operation signals come from buttons used for camera operation, such as the one disclosed in Japanese laid-open publication number 6-165009 or 6-245754.

In this embodiment, a sensor detects operations of a button on the camera work parts. In such cases, state detector 24 detects the state of input signals come from external sensor.

An external sensor is efficient in detecting the following: an event where it is difficult to detect a state in audio or image signals; and the case where a specific object state is occurring in data that is not included in the incoming audio or image signals.

It would be possible to use the function of the sensor of a camera, such as a auto focus, to detect the position of a subject (distance from a subject, or the like) or the feature of a subject (moving speed of a subject, or the like).

FIG. 27 is an flowchart describing a process of state detector 24 in this embodiment.

In step S211, when state detector 24 receives data indicating detection of user-input data (in the first embodiment, a point in time of pen-data input) from user-input data detection section 21, control proceeds to step S212. In step S212, it is checked whether one of the camera operations entered beforehand is detected within an interval starting with the statement starting point specified by the point in time of pen-data input and ending with the point in time of pen-data input. In this case, as described in the first embodiment with reference to FIG. 6, the statement starting point can be the closest statement starting point to the user-input point or the n-th closest statement starting point further away from the user-input point. The "n" in the n-th closest statement starting point is specified by the user.

Then, as a result of the detection process in step S212, if appearance of one of the camera operations entered beforehand is detected, control proceeds to step S213. In step S213, the string indicating the detected camerawork is sent to display section 25 and second memory section 23, and the specified statement starting point is sent to first memory section 22. The string indicating the detected camerawork includes "panning", "tilting", "zooming", "booming", "trimming", "dollying", "beginnings of cuts", "ends of cuts", or the like.

According to the result of detection in step S212, if no camera operations entered beforehand is detected, control proceeds to step S215, where data indicating no-detection is sent to display section 25 and second memory section 23. State detector 24 performs the process described above every time when data indicating detection of user-input is received.

Figure 28:
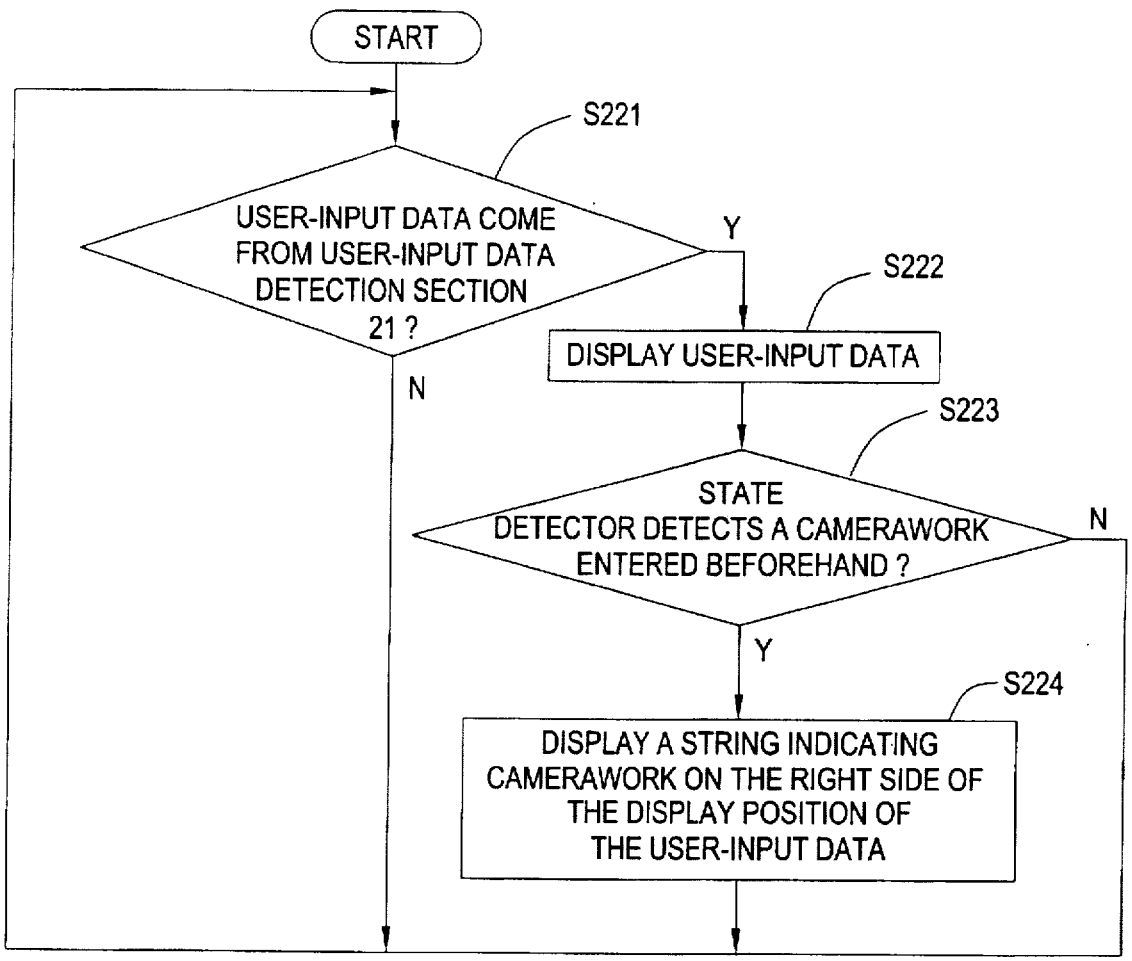
FIG. 28 is a flowchart showing an example of the operation performed by the display section of the seventh embodiment.

FIG. 28 is a flowchart describing the process of display section 25 in this embodiment. In step S221, when display section 25 receives user-input data from user-input data detection section 21, control proceeds to step S222. In step S222, the received user-input data, such as handwriting Pa of pen data, is displayed on screen 11.

After step S222, control proceeds to step S223, where it is checked to see whether state detector 24 detects a camera operation entered beforehand. That is, it is checked to see whether either data indicating a string of camerawork or data indicating no-detection of camerawork entered beforehand comes from state detector 24 or not. Then, if the data indicating a string of camerawork comes in step S223, control proceeds to step S224. In step S224, the string is displayed on the position specified by the display position of the user-input data. In this embodiment, it is displayed on the right side of the pen-data.

If data indicating no-detection of camerawork comes in step S223, camerawork is not displayed, and the control returns to step S221. In such cases, it would be possible to display a mark that indicates no-detection.

On screen 11, it would be possible to display a mark indicating occurrence of camerawork can be displayed, instead of the string of camerawork.

Figure 29:
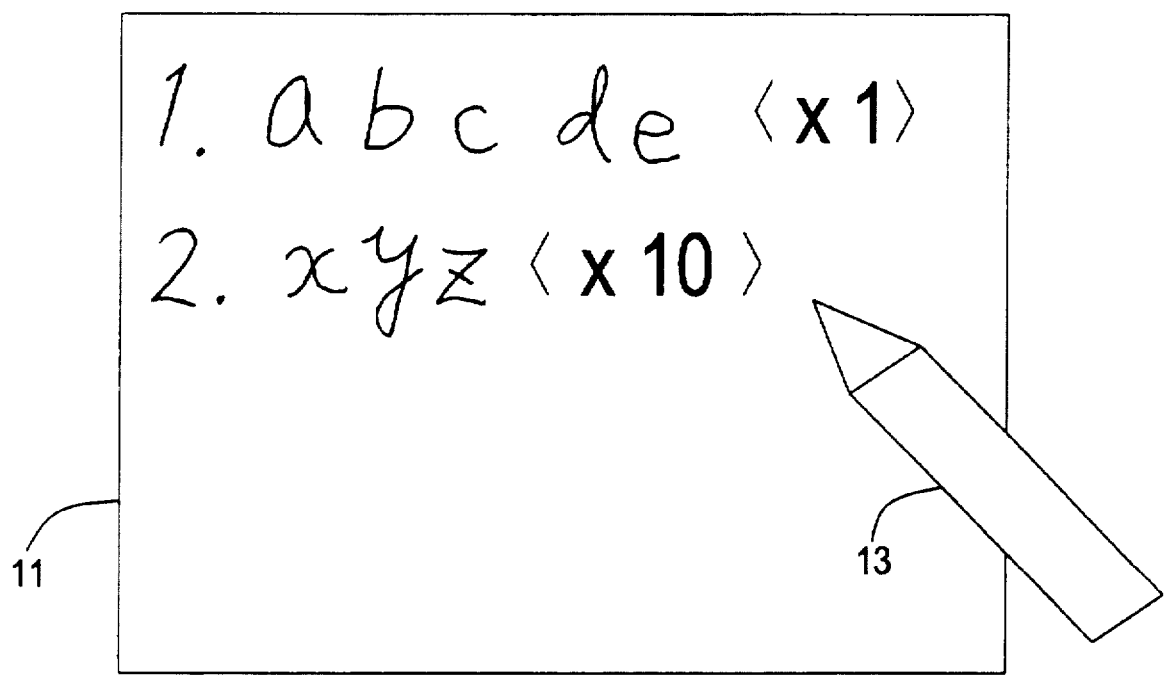
FIG. 29 shows an example of displayed image of the seventh embodiment.

FIG. 29 is an example of a screen image displayed on screen 11 in the seventh embodiment. In this example of screen image, a zoom magnification of camera when user-input data is detected by user-input data detection section 21, is displayed.

According to the seventh embodiment, since the phrase indicating camerawork is displayed on screen 11, it is easy to know whether image data that is stored corresponding to the displayed user-input data is necessary for the searcher.

|Eighth embodiment|

In the eighth embodiment, state detector 24 detects a signal coming from a sensor. The other configuration is the same as those of the first through fourth embodiment.

In this embodiment, since a signal coming from a sensor is detected, even if detection of an event in the audio or image signal is difficult, data indicating the event can be displayed on a screen. Further, audio or image signal can be retrieved by using the display as a cue.

In the following explanation of the eighth embodiment, a sensor detects the place where user-input data is entered. Since the place where the user inputs user-input data is detected and is displayed on the display position specified by the display position of the user-input data, audio or image signal can be retrieved by using the place where the user inputs user-input data as a cue.

For example, it is considered that the place where the user inputs user-input data (or where audio or image signal is inputted) is a meeting room.

State detector 24 in such cases can be configured as follows. A meeting room where user-input data is entered can be specified by analyzing positioning data outputted by a position measuring device, such as GPS (global positioning system) using an artificial satellite. If GPS is used, the latitude and longitude of the place where user-input data is entered are detected. Then, the detected latitude and longitude are compared with the latitudes and longitudes of meeting rooms to specify the position of a meeting room.

Instead of GPS, state detector 24 can be configured by the infrared transceiver disclosed by the Japanese Patent Laid-Open publication Hei.7-141389. The infrared transceiver is positioned at any place like a meeting room or a corridor, and sends a bit pattern that identifies the place. In such cases, when the user-input data is entered, state detector 24 receives a bit pattern sent by the closest infrared transceiver, and identifies the name of a meeting room according to the bit pattern. Then, data indicating the place (the name of the meeting room, for example) is displayed on the display position specified by the display position of the user-input. In stead of an infrared transceiver, wireless transmitter can be used, of course.

The process of display section 25 in this embodiment is not explained here, because it is the same as that of the seventh embodiment.

When GPS is used, the user's position can be detected even if being outdoors. Thus, the data record/playback device of this embodiment can be used as a travel recorder comprising a video camera and an electronic handwriting note using a pen computer. In such cases, positioning data is displayed on the display position specified by the display position of the handwriting note on the screen of the pen computer. Thus, the user can retrieve the recorded image of a travel by using a note and the place displayed on the screen.

In the embodiment described above, a sensor detects a position. But the following sensors also can be used: a sensor that detects the time when user-input data is detected; a sensor that detects the person who inputs user-input data; and a sensor that detects the device from which user-input data is entered (mouse, pen, keyboard, button, or the like) or the device from which audio or image signals are inputted (video camera, microphone, digital still camera, or the like).

Further, in addition to a simple physical time, person name, and device name, it would be possible to display an event that is obtained by combining the detection results from the plural sensors on the display position specified by the display position of user-input data. The events can be as follows: "being attended to a meeting"; "being with a certain person"; or the like.

|Ninth embodiment|

In the embodiment describe above, all incoming audio or image signals are stored into first memory section 22. However, it is well-known that memory capacity required to store multimedia data, such as continuously incoming audio or image signals, will be expanded. Thus, it is difficult to store coming audio or image signals within a long time into limited memory capacity.

The data record/playback device of the ninth embodiment is provided with a data compressor of multimedia data so as to store multimedia data within a long time into the limited memory capacity.

In the ninth embodiment, audio data is stored without compression same as the first embodiment. On the other hand, image data is compressed before storing. However, image data within an interval satisfying a prescribed condition is compressed in a low compression ratio or is not compressed so as to be stored at a high image quality. Image data from other intervals is compressed in a high compression ratio before storing.

In this embodiment, the following prescribed conditions can be used for varying state of compression: presence of user-input data; detection of change of state as described above in audio or image signals near the point in time of the user-input data, camerawork; the detection output from an external sensor; or the like.

In this embodiment, a state of compression of image data is displayed with user-input data. Thus, the state of compression of image data is displayed as circumstances or events near the point in time of the user-input data, with the user-input data.

Figure 30:
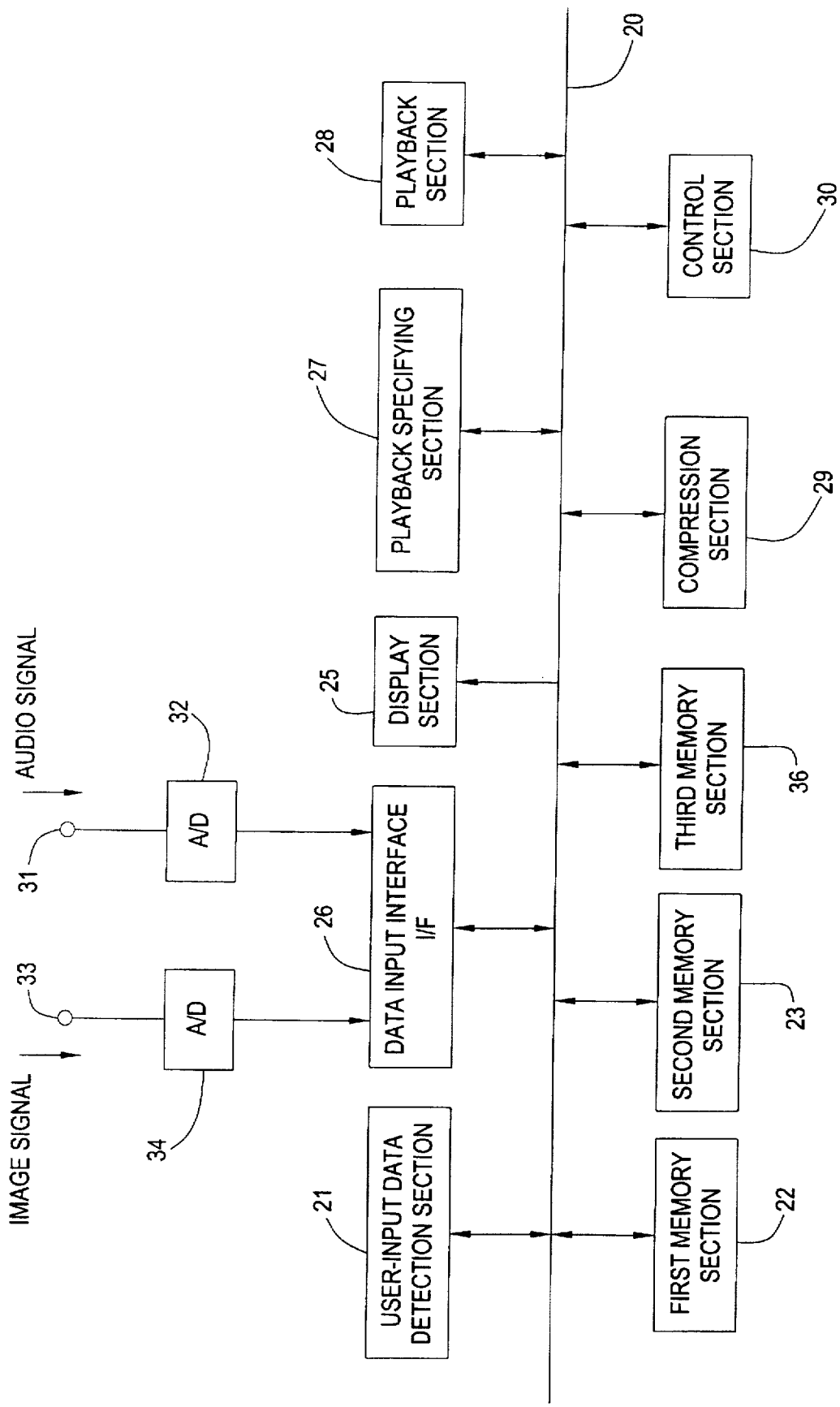
FIG. 30 is a block diagram showing the overall structure of the ninth embodiment of the data storage/playback device of the present invention.

FIG. 30 is a block diagram of the data record/playback device of the ninth embodiment, indicating the different functions of the device. The following points are different from the block diagram in the first embodiment shown in FIG. 1.

At first, compression section 29 is given. Then, instead of state detector 24, condition-matching interval detection section 35 is given. In addition, third memory section 36 is given. The other configuration is the same as that of the first embodiment shown in FIG. 1.

Condition-matching interval detection section 35 in the ninth embodiment is similar to state detector 24 described above.

Condition-matching interval detection section 35 monitors the audio signal or image signal it receives and detects audio signal intervals or image signal intervals that fulfill conditions determined beforehand.

In this embodiment, condition-matching intervals are detected based on the condition of whether audio signals at a prescribed level or higher are present. With this condition, the interval from the start to the end of a statement by a meeting attendee is detected as a condition-matching interval.

Figure 31:
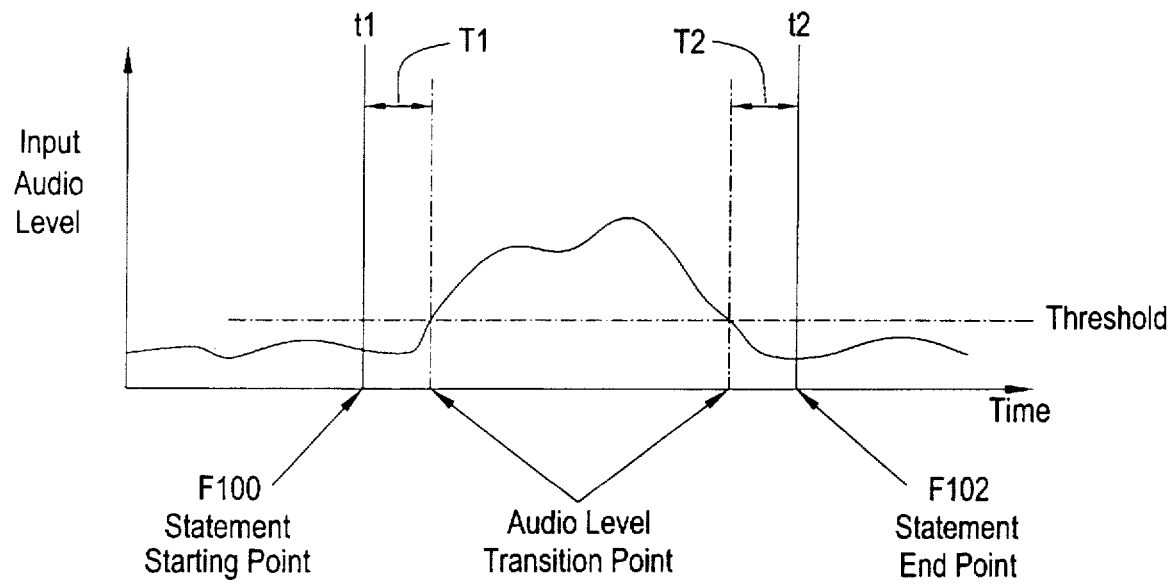
FIG. 31 is a drawing describing the detection operation of the condition-matching interval detection section of the ninth embodiment.

Referring to FIG. 31, detection in this case is performed by having condition-matching interval detecting section 35 recognize the start of a statement from a speaker when the input audio level is at or higher than a prescribed level. The end of a speaker's statement is detected when the audio level is at or below a prescribed threshold level.

However, as shown in FIG. 31, if the start and end of a statement is assumed to be at audio level transition points F101, where the audio level and the threshold level intersect, the initial and final portions of the statement will not be recorded. Thus, the starting point of the statement is set to a point F100, which precedes transition point F101 (when the audio level is changing from a low level to a high level) by a fixed interval T1. The end point of the statement is set to a point F102, which follows transition point F101 (when the audio level is changing from a high level to a low level) by a fixed interval T2.

In this embodiment, the audio level at a point in time is considered to be the "evened-out" value of the audio levels before and after that point in time. For example, the average value of the instantaneous audio levels for the two seconds before and after the point in time can be used.

In this embodiment, condition-matching interval detection section 35 has no conditions set for the image signals. The image data passes through condition-matching interval detection section 35 unchanged and is sent to third memory section 36, which serves as a temporary storage section.

In this embodiment, audio data is stored without compression. Thus, the audio data is sent to first memory section 22 without passing through the compression section 29, similar to the embodiments described above.

Figure 32:
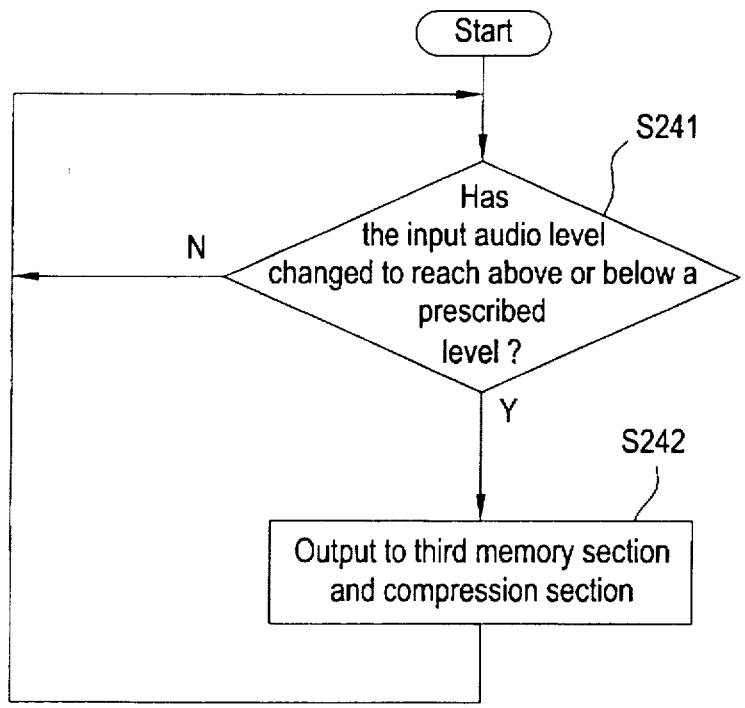
FIG. 32 is a flowchart of the operation of the condition-matching interval detection section of the ninth embodiment.

FIG. 32 is a flowchart describing the operation of condition-matching interval detection section 35. The condition-matching interval detection operation described above is performed at step S241. When the starting point or the end point of a statement from a speaker is detected, the detection result is sent to third memory section 36 and compression section 29 at step S242.

Third memory section 36 can include semiconductor memory, magnetic disks, or the like. In this embodiment, image data is stored temporarily in third memory section 36 before it is stored in first memory section 22. Also, starting and ending point data for condition-matching intervals detected by condition-matching interval detecting section 35 are stored temporarily in third memory section 36 in association with the incoming image data. Third memory section 36 receives the user-input detection output from user-input data detection section 21 and, as described later, sends the image data that was temporarily stored, in this example, to first memory section 22 via compression section 29.

Figure 33:
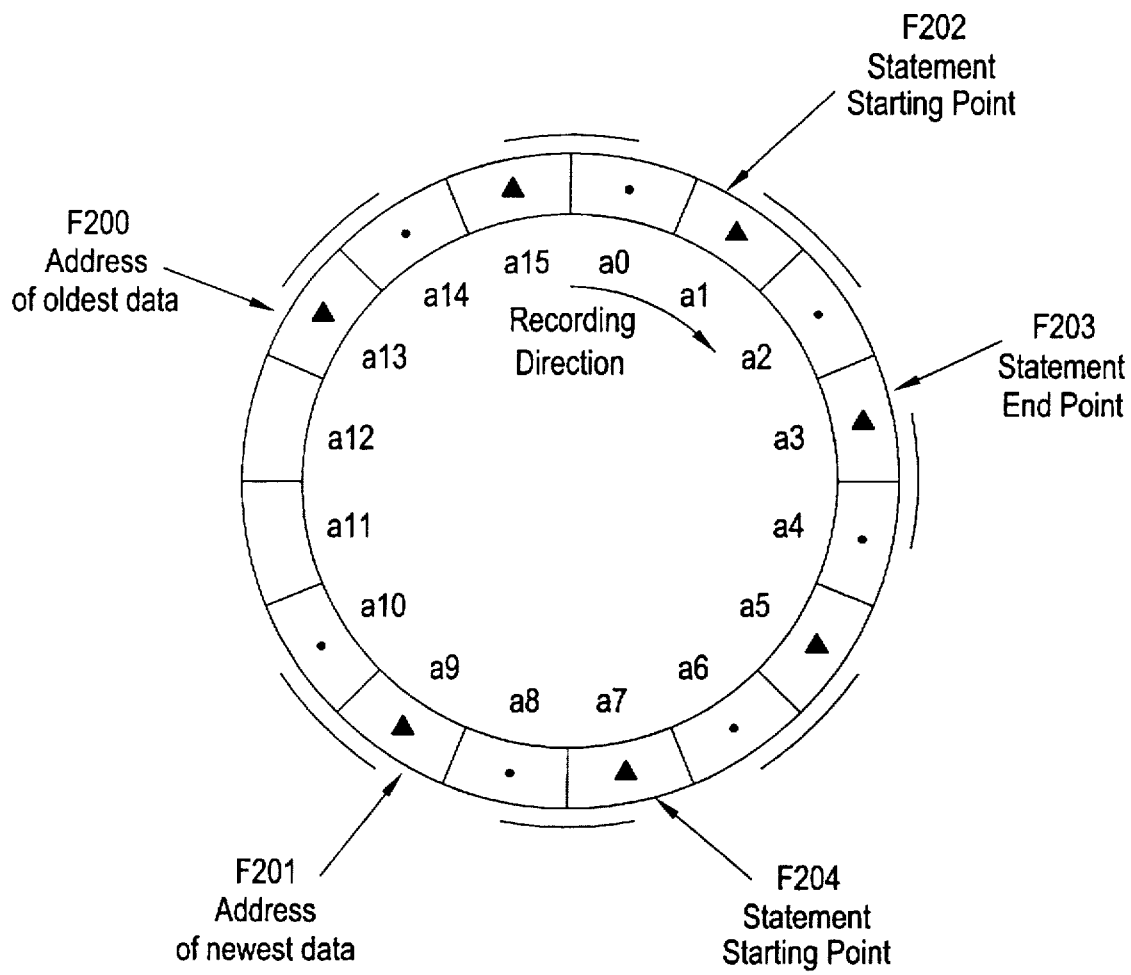
FIG. 33 is a drawing describing the recording operation performed by the third memory section of the ninth embodiment.

Referring to FIG. 33, third memory section 36 is structured as a ring buffer. The image data, which is being continuously received, and the detection results from condition-matching interval detection section 35, i.e. the starting points and end points of statements, are added into the buffer in a ring arrangement by controlling the addresses to which the data is written so that old data is overwritten by new data.

In addition to this method, it would also be possible to use other known methods such as queues, FIFO buffers, and the like. Referring to FIG. 33, the ring buffer shown in the drawing has sixteen units of memory, but there is no restriction in the number of memory units, and there is also no restriction in the number of image frames (data storage capacity) that can be held in one unit of memory.

Referring to FIG. 33, an oldest data address F200 is a pointer that points to the memory location for the oldest image among the images stored in third memory section 36. A newest data address F201 is a pointer that points to the memory location of the newest image in third memory section 36.

Starting points F202, F204 and an end point F203 are based on the detection results from condition-matching interval detection section 35 stored in third memory section 36.

The data indicating the starting points and end points can, as in this example, be stored in the ring buffer memory, or it can be stored in a memory area prepared separately.

In this embodiment, compression section 29 performs data compression of image data. In this case, compression section 29 is configured so that it can dynamically vary the amount of data compression based on the data from third memory section 36 indicating condition-matching intervals.

Assuming moving image data is used, compression section 29 in this embodiment handles the moving image data in processing units of prescribed time intervals or prescribed numbers of frames. For example, compression section 29 may perform compression by handling ten consecutive frames as a single unit in an image array. The image data from intervals outside of the condition-matching intervals described above is compressed by dropping frames, where the first frame out of the ten frames in the unit is kept and the data from the other frames are eliminated. On the other hand, with the image data from the condition-matching intervals, all ten frames are stored without performing frame-dropping compression.

Thus, when image data from intervals outside of the condition-matching intervals are played back, there are dropped frames, and the footage will show jerky motions. However, the amount of data is reduced significantly. When image data from the condition-matching intervals are played back, high-quality footage with smooth motions will be played back.

Also, instead of the compression by dropping frames, the image data within frames may be compressed using prescribed methods such as vector quantization or the like.

In the ninth embodiment, user-input data detection section 21 detects pen data inputted from the tablet 12 as user-input data. And the user-input data displayed on screen 11 is handwriting.

Figure 34:
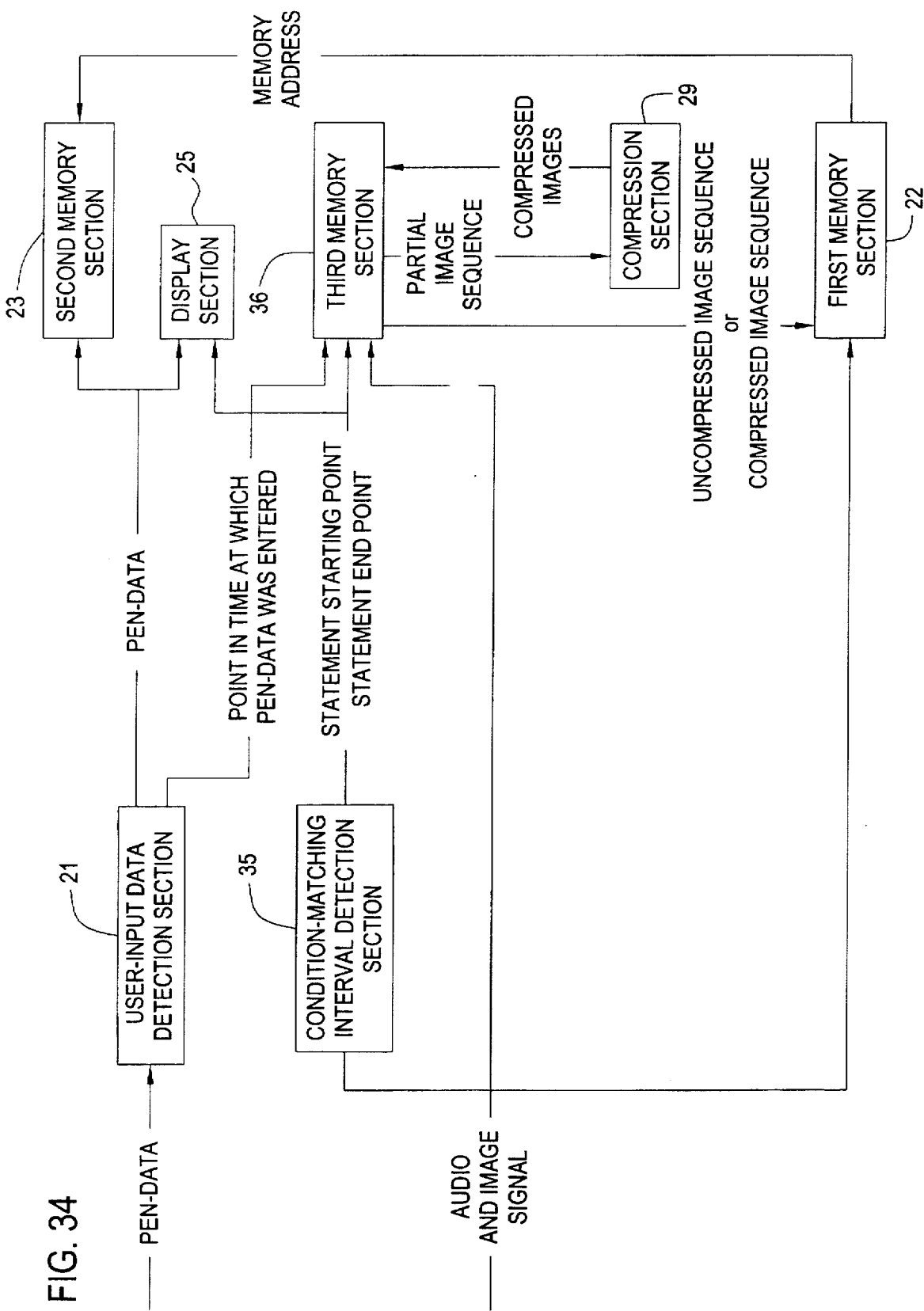
FIG. 34 illustrates a summary of the recording operation performed by the third memory section of the ninth embodiment.
Figure 35:
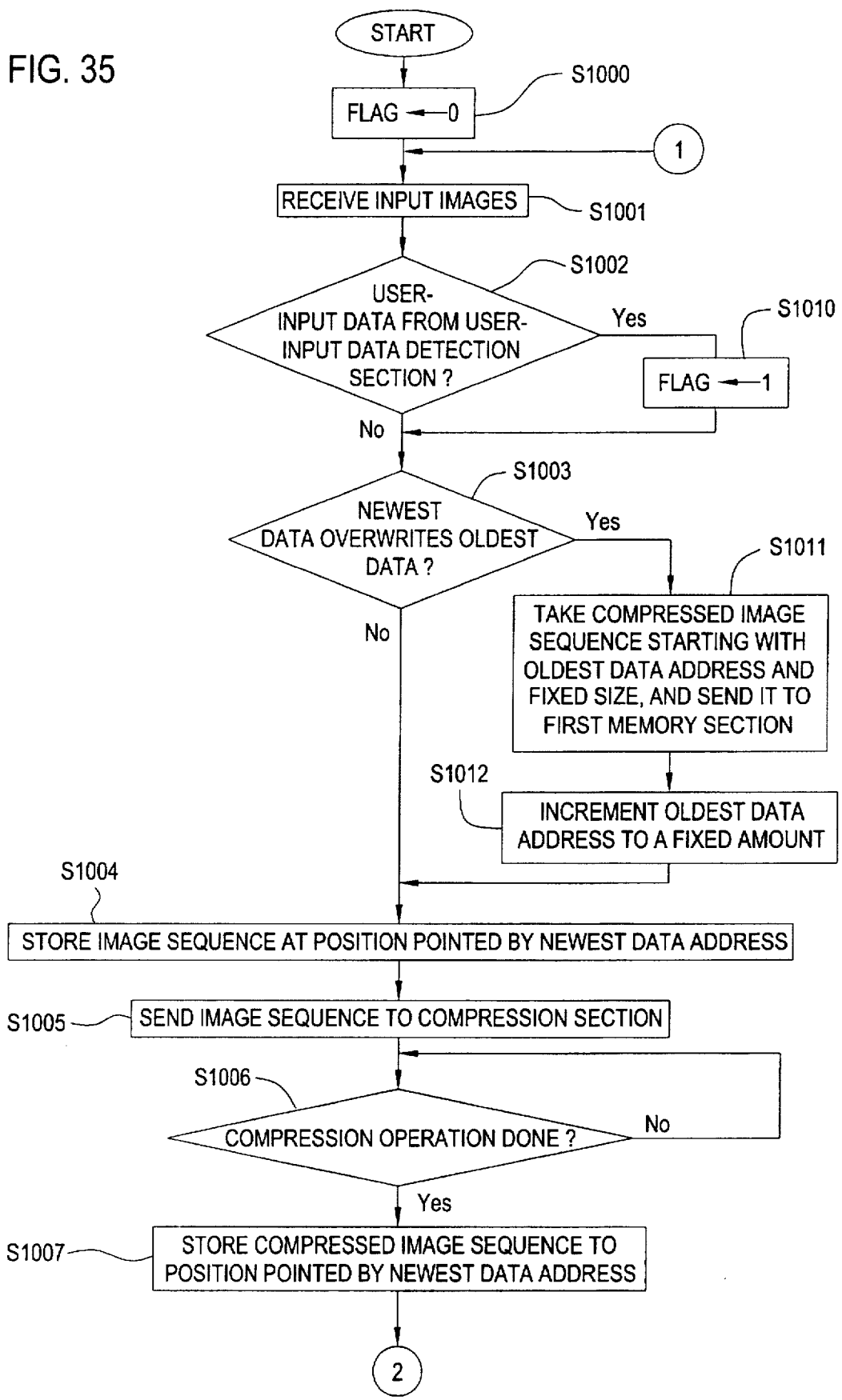
FIG. 35 is a section of a flowchart of the operation of the third memory section of the ninth embodiment.
Figure 36:
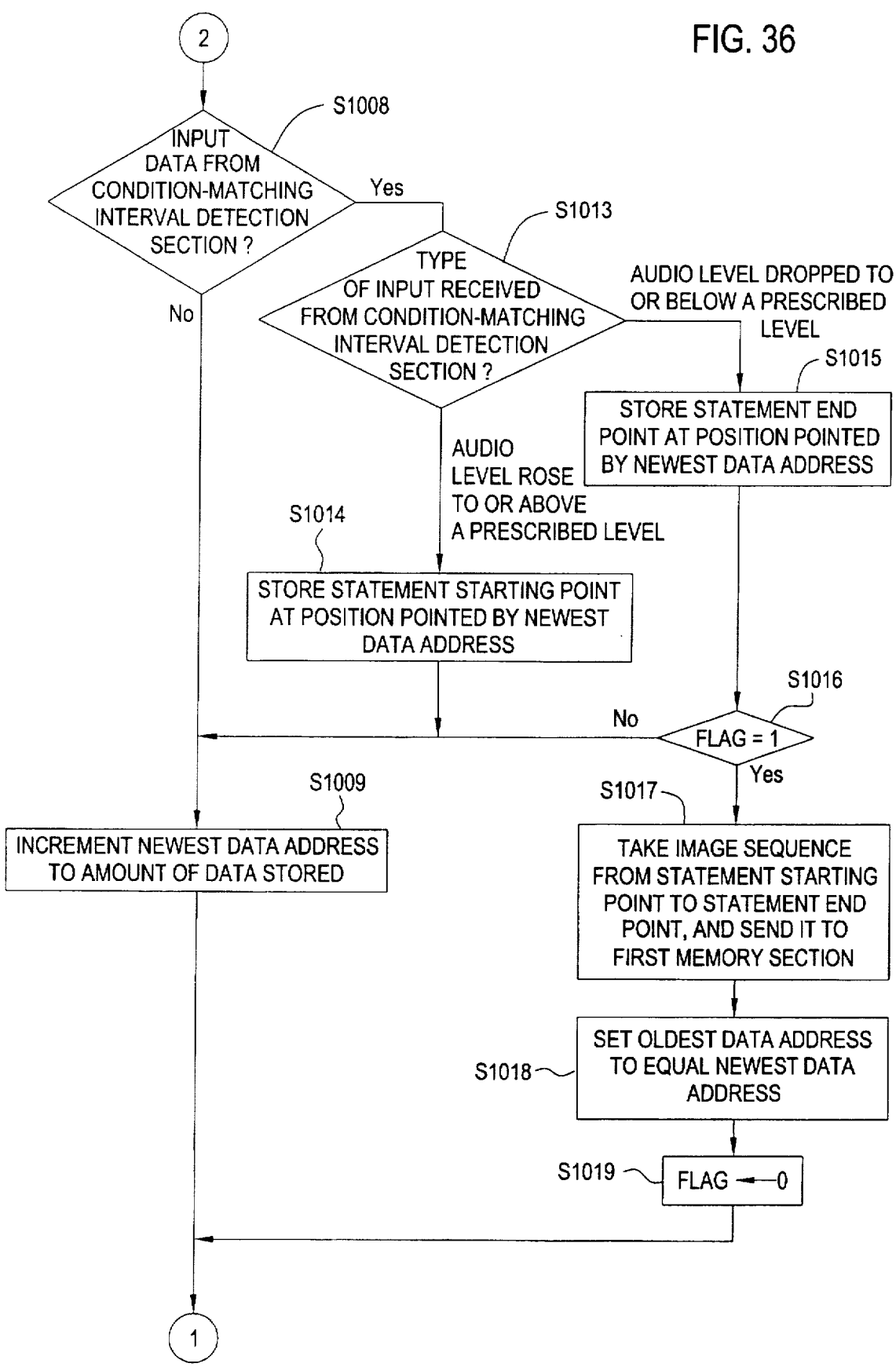
FIG. 36 is a section of a flowchart of the operation of the third memory section of the ninth embodiment.

FIG. 34 is a drawing describing the recording operation of the ninth embodiment, the flow of data involved in the operation, and the flow of output from the various sections.

The audio signal from microphone and the image signal from video camera are sent to condition-matching interval detection section 26. The image signal is sent to third memory section 36 and is temporarily stored, and the audio signal is stored in first memory section 22. In this embodiment, audio data is not compressed so it is directly sent to first memory section 22.

As described above, condition-matching interval detection section 35 compares the audio level of the audio data from microphone with a prescribed threshold level. Based on this, the starting point and end point of a statement by a meeting attendee is detected. The detected starting point and end point data are sent to third memory section 36 and compression section 29.

As described above, third memory section 36 temporarily stores image data to be stored in first memory section 22. The image data from the interval between the statement starting point and the statement end point, which is detected by condition-matching interval detection section 35, is stored into first memory section 22 in high quality without being compressed, and image data from the other intervals is compressed by the dropping frames, and is stored into first memory section 22.

The incoming image signal is continuously saved to third memory section 36 without being compressed. However, there may be cases when batch compression of the data from third memory section 36 may take compression section 29 a long time. In such cases, it would be necessary to prepare a large amount of buffer memory to be used as temporary storage for image signals captured by the camera during compression, as well as detection results obtained from user-input data detection section 21.

In the ninth embodiment, third memory section 36 is used to simultaneously store image data that is not compressed along with image data that has been compressed.

For example, ten frames are assumed as a single unit of processing. If a 10-frame image-sequence is received, third memory section 36 would contain an uncompressed, 10-frame image data sequence, as well as a single frame image resulting from 1/10 compression by compression section 29. Thus, when image data sequences are received in units of 10 frames, each sequence is sent from third memory section 36 to compression section 29, where the compression operation using dropped frames is performed as described above. Then, the compressed data is returned from compression section 29 to third memory section 36 and saved.

Uncompressed, high-quality image data within a statement interval beginning with a statement starting point and ending with a statement end point detected by condition-matching interval detection section 35 is transferred from third memory section 36 to first memory section 22. In this embodiment, uncompressed, high-quality image data within an interval beginning with the statement starting point, which immediately precedes the pen input point, and ending with the statement end point which immediately follows the pen input point ,is transferred from third memory section 36 to first memory section 22.

Instead of the statement starting point immediately preceding the pen-input point, a statement starting point further away from the pen-input point (the n-th closest statement starting point) could be used as the header for the high-quality storage interval. In the same way, a statement end point further away from the pen-input point (the n-th closest statement end point) could be used as the end for the high-quality storage interval. It would be possible to have the user select the "n" in the n-th closest statement starting point or statement end point.

The image data outside of the statement interval starting with the statement starting point and ending with the statement end point detected by condition-matching interval detection section 35 is compressed through dropped frames, where a single frame out of the 10-frame unit is kept, and the remaining single frame image is transferred from third memory section 36 to first memory section.

Third memory section 36 saves the data indicating both statement starting points and statement end points from condition-matching interval detection section 35.

According to the structure of the ninth embodiment, compression section 29 can perform compression of each 10-frame unit and does not have to perform compression of a large data sequence all at once. This eliminates the need for the buffer memory described above. When image data is transferred from third memory section 36 to first memory section 22, the data does not need to pass through compression section 29 to be compressed. Instead, the image data is directly transferred from third memory section 36 to first memory section 22.

FIGS. 35 through 37 and FIG. 38 are flowcharts describing the operations involving third memory section 36 and a flowchart describing the operations of compression section 29, respectively, when image signals are compressed and stored sequentially into third memory section 36 in accordance with the detection result obtained from condition-matching interval detection section 35.

In these flowcharts, the flag is set to "1" to indicate that user input has been detected, and the flag is set to "0" to indicate that user input has not been detected.

First, at step S1000, the flag is reset to "0". Next, at step S1001, a single time unit's worth of images are received, e.g. a 10-frame image data sequence. Step S1002 determines whether detection output from user-input data detection section 21 is present. If user-input data is detected, control proceeds to step S1010, the flag is set to "1", and control proceeds to step S1003. If no user-input data is detected, the flag remains set to "0", control proceeds to step S1003.

If, at step S1003, it is determined that the newest data does not overwrite the oldest data in the ring buffer, control proceeds to step S1004. The uncompressed 10-frame image data sequence that was received is stored in third memory section 36 at the address indicated by the newest data address. Control then proceeds to step S1005. Next, at step S1005, the 10-frame image data sequence that was received is sent to compression section 29. Control then proceeds to S1006, and the completion of the compression operation by compression section 29 is awaited.

Compression section 29 will perform compression through dropped frames on this image data sequence, compressing the sequence into a single frame. Then, the compressed image will be returned to third memory section 36. Therefore, at step S1007, the compressed image data is stored in third memory section 36 at the location immediately after the 10-frame, uncompressed image data sequence saved at step S1004.

Referring to FIG. 33, the following is a description of the operations performed from step S1004 to step S1007. At step S1004, the 10-frame, uncompressed image data sequence is stored in third memory section 36 at memory a9 indicated by newest data address F401. Then, at step S1007, the single frame compressed image compressed using frame-dropping by compression section 29 is stored in memory a10, which immediately follows the 10-frame, uncompressed image data sequence. Here, the memory capacity of memory a9 and memory a10 are not identical, with memory a9 having 10 times the memory capacity of memory a10.

After step S1007 is completed, step S1008 checks to see if data indicating a statement starting point or a statement end point has been received from condition-matching interval detection section 35. If data indicating a starting point or an end point was detected, control proceeds from step S1008 to step S1013, and the data from condition-matching interval detection section 35 is evaluated to see whether it indicates a statement starting point or a statement end point.

If the data indicates a statement starting point, where the audio level changes to a level at or higher than a prescribed level, then control proceeds to step S1014, where the statement starting point marker is stored in the memory position indicated by the newest data address. Then, control proceeds to step S1009.

If, at step S1013, it is determined that the data indicates a statement end point, where the audio level changes to a level at or below a prescribed level, then control proceeds to step S1015, where a statement end point marker is stored in the memory position indicated by the newest data address. After step S1015, control proceeds to step S1016, which checks to see if the flag is set to "1". If the flag is set to "1", then control proceeds to step S1009.

If step S1016 determines that the flag is set to "1", i.e. that user-input data was detected, then control proceeds to step S1017. From the image data sequence stored in third memory section 36, an image data sequence beginning with the image frame from the statement starting point preceding the detection of user-input data and ending with the image frame from the statement end point, is selected. The selected image data sequence is sent to first memory section 22. Then, control proceeds to step S1018, and the oldest data address is equated with the newest data address to clear third memory section 36. Then, control proceeds to step S1019, where the flag is reset to "0". Control then returns to step S1001.

If, at step S1008, it is determined that there is no detection output from condition-matching interval detection section 26, then control proceeds to step S1009. At step S1009, the newest data address is incremented according to the size of the saved data. Then, control returns to step S1001.

Referring to FIG. 33, the following is a description of the operation performed at step S1009. It is assumed that the newest data address pointed to memory a9 when no image data input was present. At step S1004, a 10-frame, uncompressed image data sequence is saved to memory a9. At step S1007, a single compressed image is saved to memory a10. In this case, the newest data address would be incremented to memory a11.

If user-input data detection section 21 does not detect entry of pen-input data at step S1002, and data from third memory section 36 is about to be erased at step S1003 (the newest data is about to overwrite the oldest data), then only the compressed image from the fixed amount of image data is sent to first memory section 22 at step S1011. In other words, from the image data having a fixed, pre-determined size, the uncompressed image data sequence is not sent to first memory section 22 and is discarded. Then, control proceeds to step S1012, and the oldest data address is incremented by the fixed, predetermined amount. Then, control proceeds to step S1004, and the operations described above are repeated.

In the embodiment above, the description covered cases where non-compressed image data sequences and compressed image data sequences compressed by compression section 29 are both stored in adjacent memory positions within the same memory section. However, the present invention is not restricted to this example, and it would be possible, for example, to have the non-compressed image data sequence and the compressed image data sequence stored in separate temporary memory sections. In such cases, the data from condition-matching interval detection section 35 indicating statement starting points and statement end points would be sent to both temporary memory sections.

Another possibility would be to take the continuously incoming image data and continuously compress and store the data in third memory section 36. At the same time, an uncompressed image data sequence, for which no compression is performed, is saved directly to first memory section 22. When user-input data detection section 21 detects pen-input data, the uncompressed image data sequence stored in first memory section 22 is left unchanged in first memory section 22, and the compressed image data sequence stored in third memory section 36 is erased from third memory section 36.

In this case, if user-input data detection section 21 does not detect pen-input data, and the compressed image data sequence is about to be erased from third memory section 36, then the uncompressed image data sequence, saved in first memory section 22 at the same time as the compressed image data sequence to be erased was saved, is overwritten by the compressed image data sequence that was about to be erased. This configuration eliminates the need to copy large amounts of image data from third memory section 36 to first memory section 22.

Another alternative would be to take the continuously incoming image data and save the data directly to third memory section 36 without compression. At the same time, a compressed image data sequence compressed through frame-dropping is saved to first memory section 22. When pen-input data is detected by user-input data detection section 21, then the compressed image data sequence stored in first memory section 22 is overwritten by the uncompressed image data sequence stored in third memory section 36.

In this case, if user-input data detection section 21 does not detect pen-input data, and the compressed image data sequence is about to be erased from third memory section 36, then the uncompressed image data sequence, saved in first memory section 22, is left unchanged, and the uncompressed image data about to be overwritten in third memory section 36 is erased. With this configuration, the need to copy large amounts of image data from third memory section 24 to first memory section 22 is eliminated.

Thus, the ninth embodiment covers configurations where uncompressed image data and compressed image data based on the same incoming image data are both saved either in a single memory section or in separate memory sections.

Figure 37:
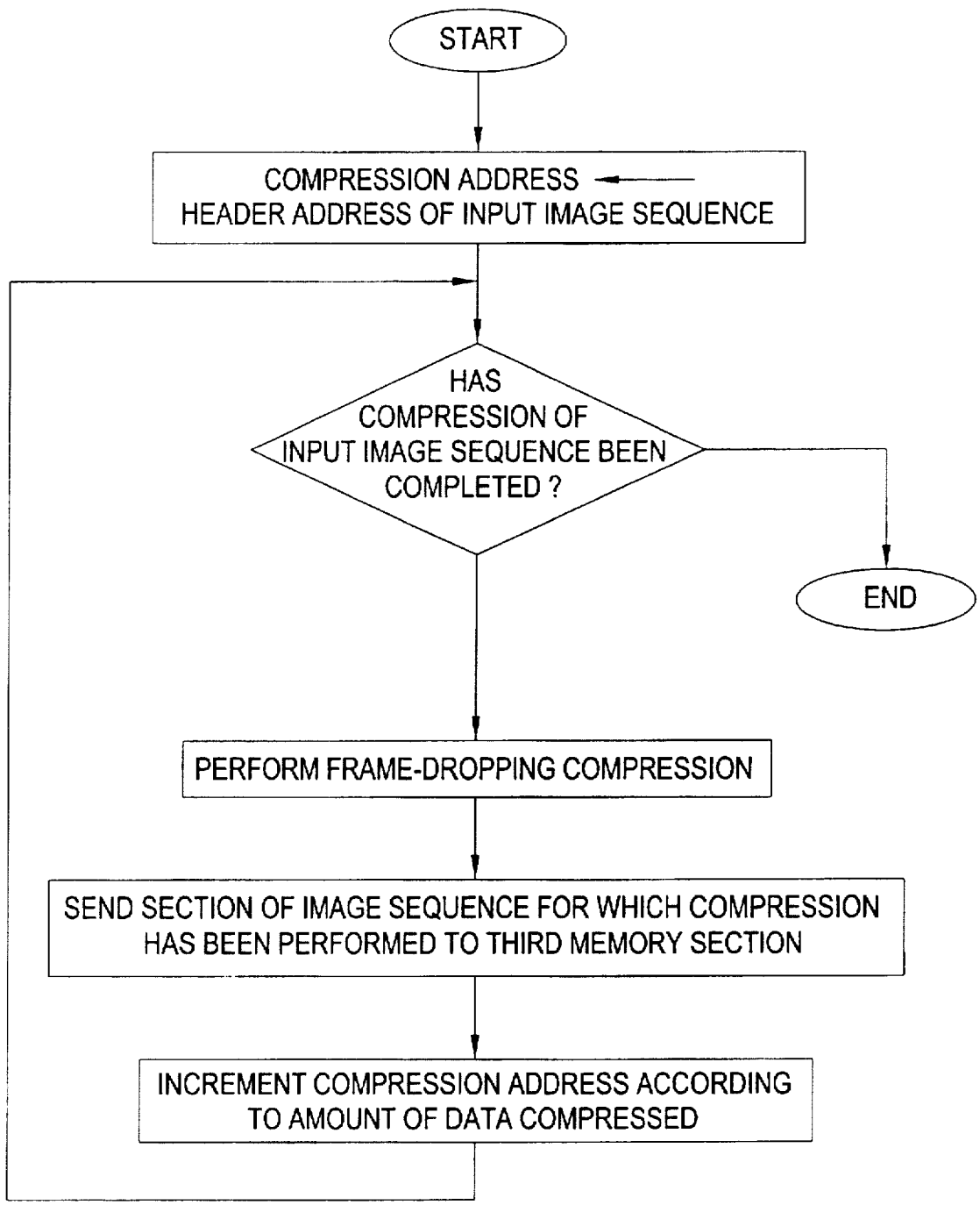
FIG. 37 is a flowchart of the operation of the compression section of the ninth embodiment.

FIG. 37 is a flowchart describing the operation of compression section 29 in the ninth embodiment.

First, initialization is performed at step S1100, and the compression address is set to the header address of the incoming image data sequence. Then, step S1101 checks to see if the compression of the incoming image series has been completed.

If, at step S1101, it is found that compression has not been completed, then control proceeds to step S1102. If compression has been completed, then this compression operation is exited.

At step S1102, the compression operation using the dropping of frames described above is performed. Then, at step S1103, the portion of the image data sequence for which compression has been completed is sent to third memory section 22. Then, at step S1104, the compression address is incremented according to the amount of data compressed. After step S1104, control returns to step 31101, and the steps described above are repeated.

In the third embodiment configured as described above, compression must be performed regardless of the timing of pen-data entry, and compression section 29 sends compressed image data sequences to third memory section 36. Once compression section 29 has performed frame-dropping compression, the compressed images are written to third memory section 36 (step S1103 in FIG. 24).

Figure 38:
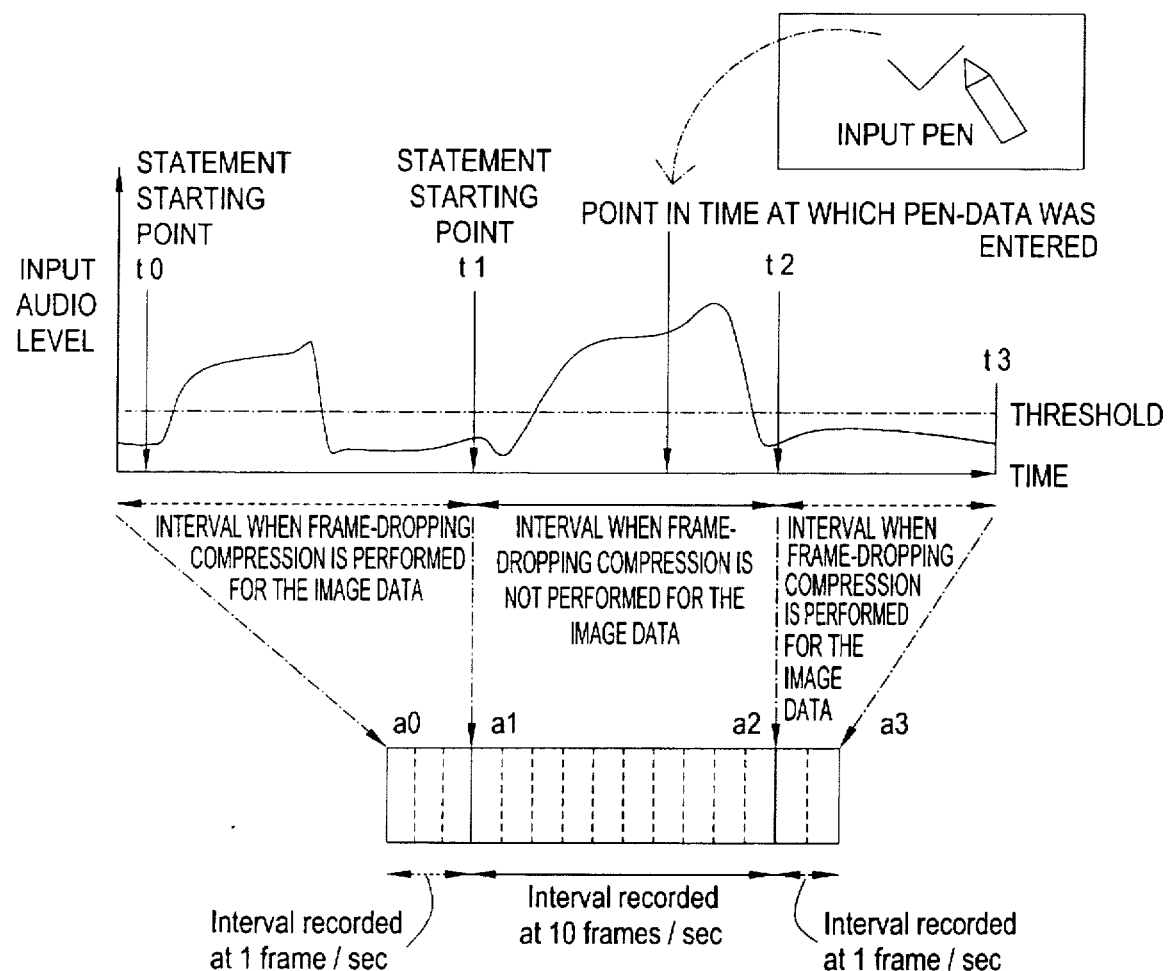
FIG. 38 illustrates association between the screen and data stored in the first memory section of the ninth embodiment.

FIG. 38 is a drawing describing the relationships between the handwriting on screen 11, the input audio levels, and the data structure used in first memory section 22.

Referring to FIG. 38, in this example the input audio levels that is over an threshold were such that the results of detection by condition-matching interval detection section 35 set a time t1 as a starting point of a statement, and a time t2 as an ending point of a statement. Also, in this example, pen input by the user was detected in the interval between time t1 and time t2. In this case, the image data from an interval t1–t2 is stored in first memory section 22 at addresses a1–a2. The image data is stored directly in high quality image (moving images of 10-frames/sec), and no frame-dropping compression is performed.

On the other hand, in the data saved in first memory section 22, frame-dropping compression is performed for the image data stored between address a0 and address a1, which precede time t1, as well as the image data stored between address a2 and address a3, which come after time t2, and the resulting low-quality image data (intermittent image of 1-frame/sec) are stored.

Figure 39:
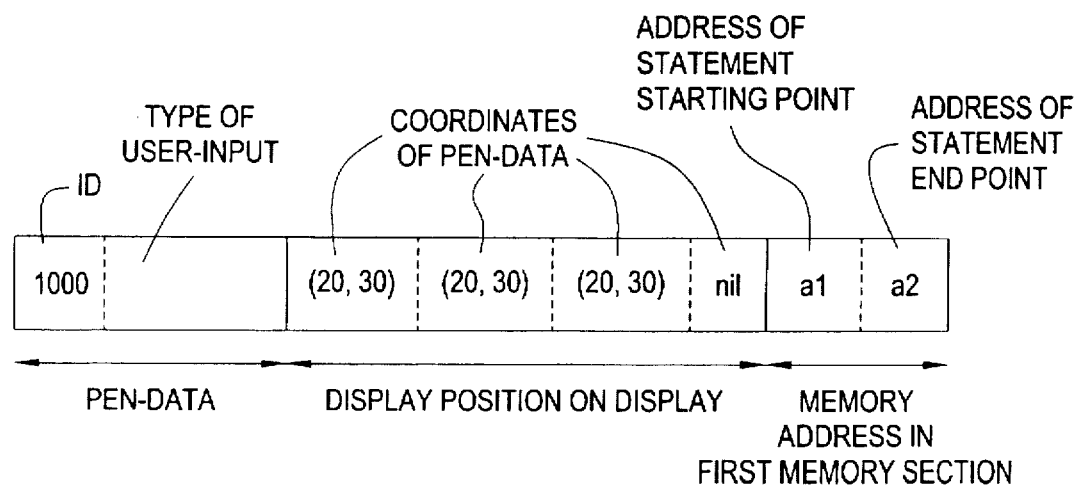
FIG. 39 illustrates the data stored in the second memory section of the ninth embodiment.

In FIG. 39, the data saved in second memory section 23 would appear as shown in the drawing. The data structure comprises handwriting data from the pen, the display position data on display section 25, and memory addresses of the high-quality image data in first memory section 22.

Data saved for the user's pen input comprises an ID uniquely identifying the user-input data, as well as data specifying the type of user-input data. For the display position data on screen 11, three sets of X-Y coordinates corresponding to the polygonal line shown in FIG. 38 and a nil indicating the end of coordinate information are saved. In this example, a coordinate (20, 30), a coordinate (30, 40), and a coordinate (60, 10) are used. For the memory addresses of the high-quality image data from first memory section 22, starting point address a1 and ending point address a2 for the statement from a speaker are saved.

The interval between statement starting point a1 and statement end point a2 are uncompressed and high-quality image.

Of course, the data stored in second memory section 23 does not have to be the pen input data, display coordinates, and memory addresses themselves, and can instead be identifiers that refer to this data. The data structure used in second memory section 23 also does not have to take the form of a table, and can instead be structured as a list.

In addition, it would be possible to have second memory section 23 store data indicating the compression state as well as the statement starting address and the statement end address, which indicate the interval storing high-quality image.

In this embodiment, the pen-input data also contains data specifying the type of user-input data. A sequence of coordinate points representing multiple lines or the like is saved as a single unit of pen-input data. Thus, during playback, one of these coordinate point sequences can be specified in order to indicate the pen-input data corresponding to that sequence of coordinate points. Then, the image or audio data from that memory address can be played back.

Furthermore, a plurality of coordinate point sequences entered consecutively within a prescribed time interval can be stored as a single unit of pen-input data. This allows a line of characters to be considered as a unit of pen-input data. Any of the coordinate point sequences making up the line of characters can then be specified to playback the audio or image data from that memory address. This makes operations more convenient.

Figure 40:
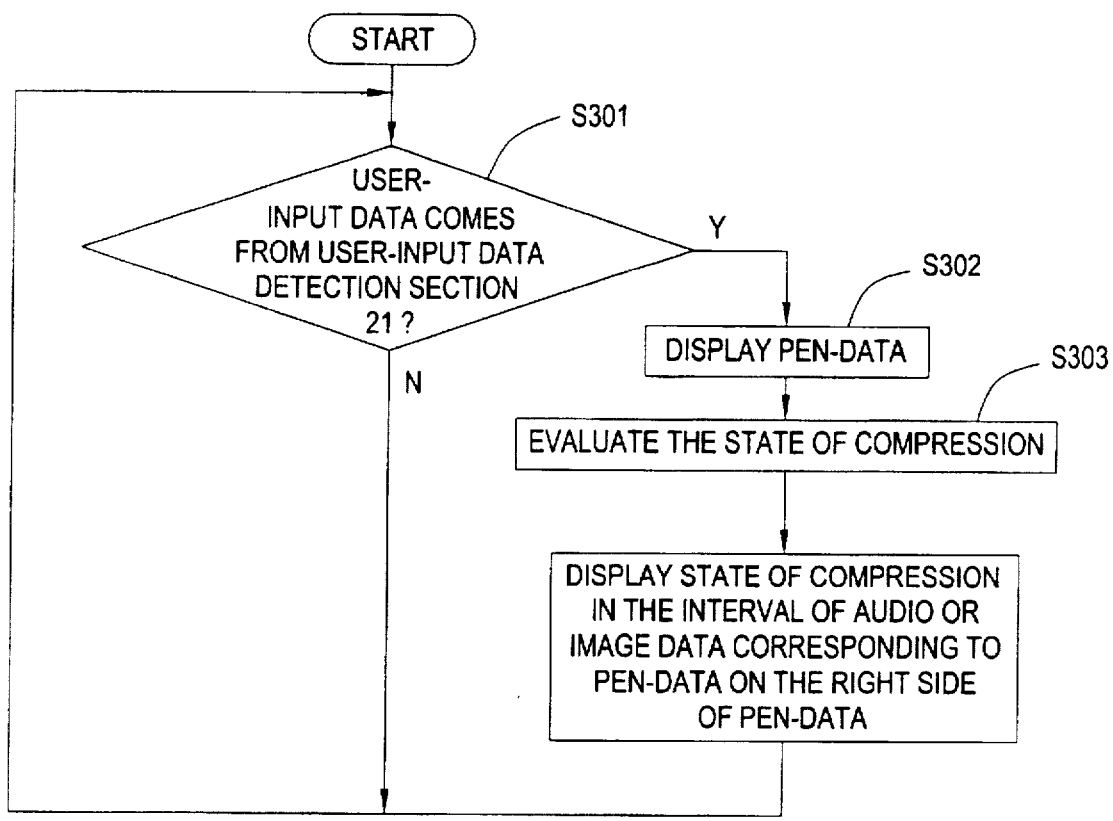
FIG. 40 is a flowchart showing an example of the operation performed by the display section of the ninth embodiment.

Next, the process of display section 25 in the ninth embodiment is explained with reference to a flowchart shown in FIG. 40.

Figure 41:
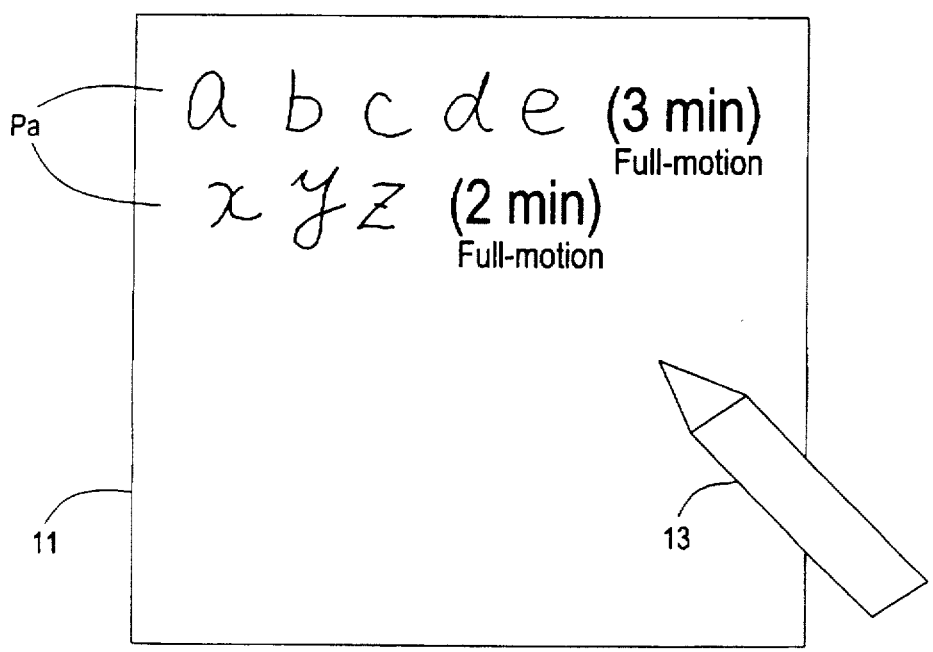
FIG. 41 shows an example of displayed image of the ninth embodiment.

In step S301, when display section 25 receives pen data from user-input data detection section 21, control proceeds to step S302. In step S302, handwriting Pa of the pen data is displayed on screen 11 as shown in FIG. 41.

After step S302, control proceeds to step S303. In step S303, display section 25 receives data indicating the statement starting point and the statement end point detected by condition-matching interval detection section 35, and determines the state of compression. Then, in step S304, a string indicating the determined state of compression is displayed on the right of the handwriting Pa of the pen-data.

In this embodiment, when data indicating no-detection of statement starting point t1 or statement end point t2 is detected in step S303, it is recognized that image data compressed by dropped-frame compression has been stored. Then, for example, a string "dropped-frame compression" is displayed on the right of the handwriting Pa.

Meanwhile, when data indicating a statement starting point and a statement end point is obtained, it is recognized that high-quality image data has been stored. Then, for example, string "full motion" is displayed on the right of the handwriting Pa as shown in FIG. 41. Further, in this embodiment, a string indicating the length of the interval storing high-quality image data, which is calculated according to the data indicating a statement starting point and a statement end point, is displayed as shown in FIG. 41.

The data stored as described above can be played back as follows. When the user designates one of the plural pen-data displayed on screen 11 by using a pen, for example, through playback specifying section 27, only audio or image data coming around the point in time of a pen-data input can be partially played back.

In this embodiment, a record time of motion images is displayed on screen 11. Thus, when the user wants to see a scene, the user can know easily how long it takes to see the scene (to play back a record of the scene). In addition, since the phrase indicating a compression ratio is displayed, the searcher can know easily whether the scene is the desired media or not.

It would be possible to display recording time, a compression ratio, or intervals in recording interruptions as a state of compression. Further, instead of displaying a string indicating a state of compression, it would be also possible to vary the display format of user-input data so as to display a state of compression, in the same way as the second embodiment.

In the ninth embodiment, the audio signals are not compressed. However, it is also possible to compress the audio signals for storage, just as in the video signals. In such cases, audio signals and image signals from a microphone and a video camera would be sent to the device of this embodiment. These signals would be compressed according to the detection result of condition-matching interval detection section 35 and then sent to third memory section 36 for temporary storage.

Then, when user-input data detection section 21 detects the entry of pen-input data, the audio and image data stored temporarily in third memory section 36 is sent to first memory section 22. The compression method used for the audio data can involve known methods such as varying the recording time, sampling frequency, or number of encoded bits.

It would be possible to configure the ninth embodiment including an editing function as described in the third embodiment.

Further, as described in the fourth embodiment, it would be allowed not to display usually a state of compression of a memory portion of audio or image data corresponding to the user-input data. Instead, when the user designates user-input data, a state of compression of only the audio or image data corresponding to the user-input data is displayed. In such cases, as described above, memory addresses stored in second memory section 23 corresponds to a statement starting point and a statement end point, and indicates a state of compression. Thus, a state of compression and a time length of a condition-matching interval can be displayed with reference to the memory addresses stored in second memory section 23.

Further, what is to be detected by condition-matching interval detection section 35 are not restricted to the interval of a statement used in this embodiment. Instead, condition-matching interval detection section 35 can detect what is detected by state detector 24 in the fifth through eighth embodiments.

For example, it would be possible to configure the record/playback device such that it automatically identifies the speaker and the audio or image signals are compressed using compression ratio based on the identified speaker. For example, there are two speakers: a speaker A and a speaker B. When the statements from speaker A have a greater importance compared to the statements of speaker B, image data regarding speaker A will be stored in a higher-quality image.

The method used to identify a speaker can involve identification based on characteristics of the audio signals (voiceprints, or the like), or can involve identification based on the facial and mouth motions of the speakers determined from the image data. Also, individual microphones can be set up for each speaker. Each microphone can be identified as corresponding to a particular speaker. Alternatively, the audio input levels from each of the speakers microphones can be compared, and the phase differences between the audio signals can be analyzed. Thus, the audio signals from multiple microphones can be analyzed, and the position of the sound source can be determined to identify the speaker.

For example, as the detection condition of the condition-matching section 35 can include the following: the appearance of a keyword entered beforehand in the incoming audio signal; the appearance of an audio pattern entered beforehand in the incoming audio signal;. the appearance of a keyword entered beforehand in the incoming image signal; the appearance of a state pattern entered beforehand in the incoming audio signal; a type of camerawork; and a state detected by an external sensor.

Thus, condition-matching interval detection section 35 of the present invention covers sections that detects the following: the state of incoming multimedia data (for example, audio or image signals); and the state of signals detected by an external sensor while incoming multimedia data is present.

[Other variations]

In addition to the above-described nine embodiments, it would be possible to implement other combinations of the embodiments. For example, the ninth embodiment was described as a variation on the first embodiment, but the same variations could applied to the second embodiment. Also, the fifth through eighth embodiments can all be modified as variations on the first or second embodiment.

Further, in the embodiments described above, this invention is applied to a multimedia record/playback device. However, a use of this invention is not limited to that. For example, this invention can be applied to a device that does not have the multimedia storage function or multimedia playback function.

Thus, in a device that is configured by eliminating first memory section 22, playback specifying section 27 and playback section 28 from the whole configuration shown in FIG. 1, display section 25 displays pen data entered by user-input data detection section 21, and a speaker name of sounds detected by state detector 24 when the pen data is entered. Thus, this invention can be applied to a system that does not save incoming audio or image signals.

The sequentially recorded multimedia data can be an analog signal sent from a camera, a microphone, a video deck, a tape recorder, a sensor, or the like, or the data can be a digital signal encoded from such an analog signal. Furthermore, the data can be a digital signal received through a computer network/computer bus. In other words, the multimedia data referred to in the present invention can be any data that is sequentially received over time.

User-input data detection section 21 can detects when the user has written something with the pen. It would also be possible to detect when pen input has been interrupted for a fixed interval or longer. For example, a sequence of plural coordinate points consecutively entered within a prescribed time interval is recognized as a single unit of pen-input data. For example, if an interval starting with when a stylus pen is separated from the input-surface of a tablet and ending with when the stylus pen again contacts the input-surface of the tablet is at or less than one second, these plural pen inputs are considered as a single unit of pen-input data.

It would be possible to have the user vary the interval. Further, when a coordinate point where a stylus pen is separated from the input-surface of a tablet and a coordinate point where the stylus pen again contacts the input-surface of the tablet are apart from each other more than a prescribed distance, those two points are considered as separate pieces of pen-input data, despite the interval is at or less than one second.

For example, this allows a line of characters to be considered as a unit of pen-input data. Any of the coordinate point sequences making up the line of characters can then be specified to playback the audio or image data from that memory address. This makes operations more convenient. It would be also possible to recognize a sequence of coordinate points representing multiple lines a composite object intentionally grouped by the user as a single unit of pen-input data.

Display section 25 can be configured by a CRT monitor, a liquid crystal monitor, or a projector, instead of a pen/tablet integrated type input device. Thus, on display section 25, a detection result from state detector 24 or a state of compression of the stored data within the interval detected by condition-matching interval detection section 35 should be displayed with user-input data detected by the user-input detection section 21.

In the embodiments above described, there is initially no displayed data on screen 11. However, the present invention is not restricted to this example, and there can, for example, be a number of pieces of user-input data already displayed in the initial state, with the user being able to make additions and changes. However, in such cases, the user-input data that can be specified for playback is restricted to the sections that had been changed from the initial state.

A data record/playback device of the present invention can be used so that when the recorded audio or image signals are being played back, the user-input data is also reproduced in sequence on the screen. For example, the display on display section 25 returns to the state of the display when the pen-input data specified by playback specifying section 28 was entered. The audio or image data is then reproduced with the pen-input data in synchronization.

In such cases, a detection result from state detector 24 or a state of compression is displayed with the user-input data on display section 25. The display screen can be returned to the display from that point in time by repeatedly performing UNDO operations on display screen until that point in time is reached. It would also be possible to clear the screen and then sequentially display the pieces of user-input data stored in second memory section 23 at a high-speed until tat point in time is reached.

As described above, the data record/playback device of the embodiments described above is provided with a state detector that detects a state of continuously incoming audio or image signals, and a display section, which displays a detection result detected by the state detector when user-input data is entered on the display position specified by the display position of the user-input data. Thus, the user-input data entered by the user and data indicating circumstances when the user-input data was entered are displayed in association with each other. This makes it possible to use data indicating circumstances when the user-input data was entered, as a cue of retrieving. Data indicating circumstances at the time when the user-input data means data indicating a background of entering each user-input data.

Further, a state of compression in the first memory section of audio or image signals entered when user-input data is detected, is displayed on the position specified by the display position of the user-input data. This make it possible, before playing back or retrieving the recorded audio or image data, to have the user know how long it takes to play back the desired scene or whether the audio or image data to be played back is stored at a desired media state.

Further, when user-input data is entered, the circumstances, which is data indicating the background of entering the user-input, is automatically displayed in association with the user-input data.

Further, a detection result from the state detector or a state of compression of data from the interval detected by the condition-matching interval detection section is displayed only for the user-input data specified by the playback specifying section. This makes it possible to display the result from the state detector or a state of compression of stored data only when the user sends a request, and to avoid to complicate the display screen.

Further, since an editing section is provided for editing a detection result of the state detector or a state of compression displayed on the display section, an erroneous detection result or the like can be corrected.

Further, according to the data obtained during the detection process of the state detector, candidates for the detection results of the state detector such as an interim result of the speaker recognition, are stored in second memory section 23. Then, the stored candidates are shown to the user and the user are allowed to select a detection result to be displayed from them. This makes it possible to reduce the burden on the user for correcting the detection result of the state detector.

Further, the state detector or the condition-matching interval detection section detects a state detected by an external sensor. Thus, even if an event where it is difficult to detect a state of audio or image signals occurs, or change occurs in data that is not included in the incoming audio or image signals, the event or change can be detected. Or according to the detected result, a state of compression can be determined and displayed. This makes it possible to use the display for retrieving audio or image signals as a cue.

Further, since a camerawork signal is detected by the state detector, a string indicating camerawork can be displayed. The string includes "taking at zoom-up", "taking a close-range view", "taking a distant view", and "taking a moving object" or the like. This make it possible to have the searcher determine easier whether data to be played back is desired image object.

Further, when the condition-matching interval detection section detects a camerawork signal, a state of compression can be determined by evaluating the importance of multimedia data to be stored according to the camerawork signal, and the resulting state of compression is displayed on a screen. This makes it possible to have the searcher determine easier whether data to be played back is important image object.

Further, when the state detector detects data specifying the position where user-input data is detected, the user can retrieve audio or image signals by using the position where the user-input data is entered as a cue. The position includes a region name, a building name, a meeting room name or the like.

Further, when the state detector detects data specifying the time when user-input data is detected, the user can retrieve audio or image signals by using the time when the user-input data is entered as a cue. The time includes an absolute time of date, a relative time from the meeting starting time or the like.

Further, when the state detector detects data specifying the person who enters user-input data, audio or image signals can be retrieved by using data specifying the person who enters the user-input data as a cue.

Further, when the state detector detects data specifying a device from which user-input data is entered, audio or image signals can be retrieved by using a device from which the user-input data, audio data or image data is entered, as a cue.

Further, when user-input data is displayed in a variety of display format according to the state of compression of audio or image signals inputted when user-input data was detected in the first memory section, before stored audio or image data is played back, the user can know easily how long it takes to play back the scene.

Further, when at least one out of the memory time, memory interval, compression ratio and intervals in recording interruptions is displayed, the user can know a state of compression of stored audio or image data before the data is playing back. This makes it easier to determine whether the data is a desired image object.

As described above, this invention makes it possible to automatically display data indicating circumstances when each piece of user-input data is entered, which is a background of the entering of the user-input data, in association with the user-input data.

Thus, since the background of the entering the user-input data is displayed, it is easy to retrieve stored data based on the display.

Further, before playing back or retrieving stored audio or image data, the user can know easily how long it takes to play back the scene. Or the user can easily know whether audio or image data to be played back is stored by a desired media style.

What is claimed is:

1. A data record/playback device, comprising:

user input means for receiving user input from a user;

user input detection means for detecting the user input through said user input means;

consecutive data input means for receiving consecutive data including at least one of audio data and image data;

condition-matching interval detection means for detecting a condition-matching interval in the consecutive data that matches a prescribed requirement;

temporary storage means for temporarily storing the consecutive data received through said consecutive data input means in association with the condition-matching interval detected by said condition-matching interval detection means;

compression means for compressing the consecutively data stored in said temporary storage means so that a compressing state of the consecutive data from a specific interval is different from a compressing state of the consecutive data from other intervals, the specific interval being determined according to the user input detected by said user input detection means and the condition-matching interval detected by said condition-matching interval detection means;

consecutive data storage means for storing consecutive data compressed by said compression means;

association data storage means for storing association data that includes the user input detected by said user input detection means, the state detected by said state detection means, and storage position where the consecutive data is stored in association with each other; and display means for displaying the user input detected by said user input detection means and the compression state of the consecutive data that is received by said consecutive data input means when the user input is received through said user input detection means in association with each other, in accordance with the association data stored in said association data storage means.

2. The data record/playback device as set forth in claim 1, further comprising:

playback specifying means for receiving user's instruction to specify the user input; and playback means for specifying a portion of the consecutive data stored in said consecutive data storage means according to the storage position stored in said association data storage means, and for playing back the specified portion corresponding to the user input data specified by said playback specifying means.

3. The data record/playback device as set forth in claim 1, wherein said display means consecutively displays at least one user input following detection of the user input through said user input detection means; and the display device further comprising:

specifying means for specifying one of the at least one user input; and said display means displaying the state for the user input specified by said specifying means.

4. The data record/playback device as set forth in claim 3, further comprising:

editing means for editing the state displayed by said display means.

5. The data record/playback device as set forth in claim 4, wherein said editing means detects a new user input overwriting the displayed state, and makes the displayed state clear for displaying the new user input.

* * * * *